US008179995B2

(12) United States Patent
Ishihara et al.

(10) Patent No.: US 8,179,995 B2
(45) Date of Patent: May 15, 2012

(54) RECEPTION DEVICE, TRANSMISSION DEVICE, RADIO TRANSMISSION/RECEPTION SYSTEM, AND RADIO RECEPTION METHOD

(75) Inventors: Koichi Ishihara, Yokosuka (JP); Yasushi Takatori, Yokosuka (JP); Syuji Kubota, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 347 days.

(21) Appl. No.: 12/525,989

(22) PCT Filed: Feb. 22, 2008

(86) PCT No.: PCT/JP2008/053034
§ 371 (c)(1),
(2), (4) Date: Aug. 5, 2009

(87) PCT Pub. No.: WO2008/105335
PCT Pub. Date: Sep. 4, 2008

(65) Prior Publication Data
US 2010/0329389 A1 Dec. 30, 2010

(30) Foreign Application Priority Data

Feb. 23, 2007 (JP) ................................. 2007-043942
Mar. 16, 2007 (JP) ................................. 2007-069421

(51) Int. Cl.
*H03K 9/00* (2006.01)
(52) U.S. Cl. ....................................................... 375/316
(58) Field of Classification Search .................. 375/316, 375/346, 347, 348, 229; 370/203, 210; 708/200, 708/100, 400, 403, 404, 300, 322, 323
See application file for complete search history.

(56) References Cited

U.S. PATENT DOCUMENTS

| 7,170,926 B2 | 1/2007 | Zeira |
| 2003/0026345 A1* | 2/2003 | Muharemovic et al. ...... 375/260 |
| 2003/0076908 A1* | 4/2003 | Huang et al. .................. 375/350 |

(Continued)

FOREIGN PATENT DOCUMENTS

JP 2004-007353 A 1/2004

(Continued)

OTHER PUBLICATIONS

Ishihara, Koichi, Takatori, Yasushi, Kubota, Shuji; "Hidoki Single Carrier System ni Okeru Array Antenna o Mochiita Multiuser Kenshutsuho", Technical Report of IEICE, RCS2006-237, The Institute of Electronics, Information and Communication Engineers Feb. 28, 2007, pp. 5 to 8 (w/ English Abstract).

(Continued)

*Primary Examiner* — David C. Payne
*Assistant Examiner* — Vineeta Panwalkar
(74) *Attorney, Agent, or Firm* — Harness, Dickey & Pierce, P.L.C.

(57) ABSTRACT

Orthogonal converters perform orthogonal conversion on the N time-series data extracted from a received radio signal. Multi-user detectors extract transmitted signals from respective transmission devices, from the time-series data which has been subjected to the orthogonal conversion. Inverse orthogonal converters perform inverse orthogonal conversion on the extracted transmitted signal. Rectangular filter circuits remove Mh time-series data at the front end and Mt time-series data at the rear end, from the transmitted signal which has been subjected to the inverse orthogonal conversion, so as to extract Nw time-series data. Deinterleaver circuits deinterleave the aforementioned time-series data. Decoders decode the time-series data for output.

18 Claims, 22 Drawing Sheets

U.S. PATENT DOCUMENTS

| | | | |
|---|---|---|---|
| 2003/0123383 A1* | 7/2003 | Korobkov et al. | 370/208 |
| 2003/0125090 A1 | 7/2003 | Zeira | |
| 2004/0105512 A1 | 6/2004 | Priotti | |
| 2005/0035885 A1 | 2/2005 | Hosur et al. | |
| 2007/0116157 A1* | 5/2007 | Kimura et al. | 375/341 |
| 2007/0121747 A1 | 5/2007 | Zeira | |
| 2008/0144730 A1* | 6/2008 | Akella et al. | 375/260 |

FOREIGN PATENT DOCUMENTS

| | | |
|---|---|---|
| JP | 2004-343546 A | 12/2004 |
| JP | 2006-304369 A | 11/2006 |
| WO | 2006/064469 A1 | 6/2006 |

OTHER PUBLICATIONS

Ishihara, Koichi, Takatori, Yasushi, Kubota, Shuji; "Multiuser Detection Method for Single-Carrier Transmission in Uplink Multiuser MIMO Access", Vehicular Technology Conference, 2007, VTC-2007 Fall, 2007 IEEE 66th, pp. 566-570 (in English).

Takeda, Kazuaki, Tomeba, Hiromichi, Adachi, Fumiyuki; "Iterative Overlap FDE for DS-CDMA without GI", Vehicular Technology Conference, 2006, VTC-2006 Fall, 2006 IEEE 64th, pp. 1-5 (in English).

Nakajima, Akinori, Garg, Deepshikha, Adachi, Fumiyuki; "Throughput of Hybrid ARQ in Single-carrier MIMO Multiplexing", Techincal Report of IEICE, RCS2004-107, pp. 13-18, Aug. 2004 (w/ English translation).

Coon, J., Armour, S., Beach, M., McGeehan, J.; "Adaptive Frequency-Domain Equalization for Single-Carrier Multiple-Input Multiple-Output Wireless Transmission", IEEE Trans. Signal Processing, vol. 53, Aug. 2005, pp. 3247-3256 (in English).

Nishio, Keisuke, Ogawa, Yasutaka, Nishimura, Toshihiko, Ohgane, Takeo; "Fundamental Studies on MIMO-OFDM Space Division Multiplexing", Techincal Report of IEICE, DSP2002-204, SAT2002-154, RCS2002-273, (Jan. 2003), pp. 121-125 (w /English translation).

Kikuma, Nobuyoshi; "Adaptive Signal Processing with Array Antenna", Science and Technology Publishing Company, Inc., 1998, pp. 35-37 (w /English translation).

Karjalainen, Juha, et al., "Frequency Domain Joint-over-Antenna MIMO Turbo Equalization," Signals, Systems and Computers, 2005, Conference Record of the Thirty-Ninth Asilomar Conference on Nov. 1, 2005, pp. 834-838, IEEE.

* cited by examiner

FIG. 11

|  | m$^{TH}$ BLOCK | (m+1)$^{TH}$ BLOCK | (m+2)$^{TH}$ BLOCK | (m+3)$^{TH}$ BLOCK |
|---|---|---|---|---|
| USER 1 | 1 | 2 | 4 | 7 |
| USER 2 | 3 | 5 | 8 |  |
| USER 3 | 6 | ⑨ |  |  |
| USER 4 | 10 |  |  |  |

RECEPTION DEVICE, TRANSMISSION DEVICE, RADIO TRANSMISSION/RECEPTION SYSTEM, AND RADIO RECEPTION METHOD

TECHNICAL FIELD

The present invention relates to a reception device, a transmission device, a radio transmission/reception system, and a radio reception method which are used to transmit broadband signals.

Priority is claimed on Japanese Patent Application Nos. 2007-043942, filed Feb. 23, 2007, and 2007-069421, filed Mar. 16, 2007, the contents of which are incorporated herein by reference.

BACKGROUND ART

Firstly, as an example of the related art, a description will be given of a multi-user MIMO (Multiple-input multiple-output) in single-carrier transmissions which use guard intervals (GI). The related art includes a single user MIMO in a single-carrier transmission (for example, see Non-patent documents 1 and 2). Note that this related art can easily be expanded to a multi-user MIMO system.

FIG. 18 is a block diagram showing a structural example according to the related art of a $u^{th}$ single-carrier transmitter in a multi-user MIMO transmission which uses GI. FIG. 19 is a block diagram showing a structural example according to the related art of a single-carrier receiver in a multi-user MIMO transmission which uses GI.

Here, the number of transmitting stations (i.e., terminal stations: MT) is U, and the number of signal sequence (i.e., transmitter antenna) of the $u^{th}$ transmitting station is nt (u). Moreover, the number NT of the total transmitted signal sequence at a receiving station is expressed by the following formula.

[Formula 1]

$$NT = \sum_{u=1}^{U} nt(u) \tag{1}$$

Moreover, the number of receiver antennas at an access point (AP) is NR (wherein NR≧NT), and the number of discrete Fourier transform points is taken as N. The GI length is taken as Ng.

In the $u^{th}$ transmitter of a conventional single-carrier transmission such as that shown in FIG. 18, 100-$u$ is an error correction encoding section, 101-$u$ is an interleaver, 102-$u$ is a data modulation section, 103-$u$ is a serial-to-parallel conversion section, 104-$u$-1 through 104-$u$-nt (u) are GI insertion sections, 105-$u$-1 through 105-$u$-nt (u) are waveform shaping sections, 106-$u$-1 through 106-$u$-nt (u) are D/A converters, 107-$u$-1 through 107-$u$-nt (u) are radio sections, and 108-$u$-1 through 108-$u$-nt (u) are transmitter antennas.

In the $u^{th}$ transmitting station shown in FIG. 18, after the series has been encoded by the channel encoder 100-$u$, it undergoes interleaving in the interleaver 101-$u$, and then undergoes modulation by means of PSK (Phase Shift Keying) or QAM (Quadrature Amplitude Modulation) in the data modulation section 102-$u$, so that a transmitted symbol sequence is thereby created. Thereafter, the symbol sequence is divided into nt (u) streams which is the same as the number of antennas by the serial-to-parallel conversion section 103-$u$, and one block is formed for each N symbol by the GI insertion sections 104-$u$-1 through 104-$u$-nt (u). The Ng symbol at the end of the block is then copied, and is inserted as a GI, as is shown in FIG. 22.

Next, the symbol sequence undergoes waveform shaping (i.e., undergoes digital filtering to limit bandwidth) in the waveform shaping sections 105-$u$-1 through 105-$u$-nt (u), and then undergoes digital/analog conversion in the D/A converters 106-$u$-1 through 106-$u$-nt (u). The symbol sequence is then transmitted by the nt (u) number of transmitter antennas 108-$u$-1 through 108-$u$-nt (u) via the radio sections 107-$u$-1 through 107-$u$-nt (u).

Moreover, in a receiver at an AP in a conventional single-carrier transmission such as that shown in FIG. 19, 110-1 through 110-NR are receiver antennas, 111-1 through 111-NR are radio sections, 112-1 through 112-NR are A/D converters, 113-1 through 113-NR are GI removal sections, 114-1 through 114-NR are discrete Fourier transformers, 115-1 through 115-N are multi-user detectors, 116-1 through 116-NT are inverse discrete Fourier transformers, 117-1 through 117-U are parallel-to-serial converters, 118-1 through 118-U are data demodulators, 119-1 through 119-U are deinterleaver circuits, and 120-1 through 120-U are error correction decoding sections.

In FIG. 19, single-carrier transmitted signals are received by the NR number of receiver antennas 110-1 through 110-NR, and are converted into a baseband signal for each antenna by the radio sections 111-1 through 111-NR. They then undergo analog/digital conversion in the A/D converters 112-1 through 112-NR, and the GI is then removed by 113-1 through 113-NR. Thereafter, the received signals are split into N number of frequency components by the discrete Fourier transformers 114-1 through 114-NR, and signal separation is then performed in the multi-user detectors 115-1 through 115-N using the NR number of received signals as input values for each frequency component. As a result, a total number of NT transmitted signal streams is obtained as an output value.

Next, after multi-user detection has been performed by the multi-user detectors 115-1 through 115-N, the signals are inserted into time signals using the inverse discrete Fourier transformers 116-1 through 116-NT, and are then converted into time series signals for each transmitting station by the parallel-to-serial converters 117-1 through 117-U. Finally, data demodulation, deinterleaving, and error correction decoding are performed by the data demodulators 118-1 through 118-U, the deinterleavers 119-1 through 119-U, and the error correction decoders 120-1 through 120-U.

Next, multi-user MIMO (Multiple-input multiple-output) in multicarrier transmissions which use guard intervals (GI) will be described as an example of the related art (see, for example, Non-patent document 3).

FIG. 20 is a block diagram showing a structural example of a $u^{th}$ multicarrier transmitter in a multi-user MIMO transmission which uses GI of the related art. FIG. 21 is a block diagram showing a structural example of a multicarrier receiver in a multi-user MIMO transmission which uses GI of the related art.

Here, the number of transmitting stations (i.e., terminal stations: MT) is U, and the number of signal sequence (i.e., transmitter antenna) of the $u^{th}$ transmitting station is nt (u). Moreover, the total number of NT transmitted signal sequence in the receiving station is expressed in the same way as in Formula (1) given above.

Moreover, the number of receiver antennas at an access point (AP) is NR (wherein NR≧NT), and the number of discrete Fourier transform points (i.e., the number of subcarriers) is taken as Nc. The GI length is taken as Ng.

In the $u^{th}$ transmitter of a conventional multicarrier transmission such as that shown in FIG. 20, 201-$u$ is an error correction encoding section, 202-$u$ is an interleaver, 203-$u$ is a first serial-to-parallel conversion section, 204-$u$-1 through 204-$u$-$nt$ (u) are first serial-to-parallel conversion sections, 205-$u$-1-1 through 205-$u$-$nt$ (u)-Nc are data modulation sections, 206-$u$-1 through 206-$u$-$nt$ (u) are inverse discrete Fourier transformers, 207-$u$-1 through 207-$u$-$nt$ (u) are GI insertion sections, 208-$u$-1 through 208-$u$-$nt$ (u) are waveform shaping sections, 209-$u$-1 through 209-$u$-$nt$ (u) are D/A converters, 210-$u$-1 through 210-$u$-$nt$ (u) are radio sections, and 111-$u$-1 through 111-$u$-$nt$ (u) are transmitter antennas.

In the $u^{th}$ transmitting station shown in FIG. 20, after the transmission data sequence has been encoded by the error correction encoding section 201-$u$, the transmission data undergoes interleaving in the interleaver 202-$u$. The data sequence is then made to undergo serial-to-parallel conversion into the same number of streams as the number of antennas (which is nt (u)) by the first serial-to-parallel converter 203-$u$. Each of these streams is then made to undergo further serial-to-parallel conversion in the second serial-to-parallel converters 204-$u$-1 through 204-$u$-$nt$ (u), and the data string is split into Nc series which is the number of subcarriers. Modulation is then performed in the respective subcarriers based on PSK (Phase Shift Keying) or QAM (Quadrature Amplitude Modulation) by the data modulation sections 205-$u$-1-1 through 205-$u$-$n$ (u)–Nc.

Thereafter, multicarrier signals are created by the inverse discrete Fourier transformers 206-$u$-1 through 206-$u$-$nt$ (u), and a sample of the last multicarrier signal Ng is copied by the GI insertion sections 207-$u$-1 through 207-$u$-$nt$ (u), and is inserted as a GI as is shown in FIG. 22. After waveform shaping has been performed by the waveform shaping sections 208-$u$-1 through 208-$u$-$nt$ (u), and D/A conversion has been performed by the D/A converters 209-$u$-1 through 209-$u$-$nt$ (u), the signals are transmitted by the nt (u) number of transmitter antennas 211-$u$-1 through 211-$u$-$nt$ (u) via the radio sections 210-$u$-1 through 210-$u$-$nt$ (u).

Moreover, in a receiver of a conventional multicarrier transmission such as that shown in FIG. 21, 220-1 through 220-NR are receiver antennas, 221-1 through 221-NR are radio sections, 222-1 through 222-NR are A/D converters, 223-1 through 223-NR are GI removal sections, 224-1 through 224-NR are discrete Fourier transformers, 225-1 through 225-Nc are multi-user detectors, 226-1 through 226-Nc-NT are data demodulators, 227-1 through 227-NT are first parallel-to-serial converters, 228-1 through 228-U are second parallel-to-serial converters, 229-1 through 229-U are deinterleaver circuits, and 230-1 through 230-U are error correction demodulation sections.

In FIG. 21, multicarrier transmitted signals are received by the NR number of receiver antennas 220-1 through 220-NR, and they are then converted into baseband signals in each antenna by the radio sections 221-1 through 221-NR. They are then made to undergo analog/digital conversion in the A/D converters 222-1 through 222-NR, and the GI is removed by 223-1 through 223-NR. Thereafter, the received signals are broken down into Nc number of multicarriers by the discrete Fourier transformers 224-1 through 224-NR, and using the NR number of received signals as input values, the received signals are made to undergo signal separation in the multi-user detectors 225-1 through 225-N in each subcarrier. As a result, a total number of NT transmitted signal streams are obtained as output values.

Next, after multi-user detection has been performed by the multi-user detectors 225-1 through 225-Nc, data demodulation is performed in each subcarrier by the data demodulators 226-1-1 through 226-Nc-NT. The signal sequence is then made to undergo parallel-to-serial conversion using the first parallel-to-serial converters 227-1 through 227-NT, and is then further converted into signal sequence for each transmitting station by the second parallel-to-serial converters 228-1 through 228-U. Finally, deinterleaving and error correction decoding are performed by the deinterleavers 229-1 through 229-U and by the error correction decoders 230-1 through 230-U.

[Non-patent document 1]: "Transmission Performance Evaluation of Single-Carrier MIMO Multiplexing", Akinori Nakajima, Garg Deepshikha, and Fumiyuki Adachi, IEICE Tech. Rep., RCS2004-107, pp. 13-18, August 2004.

[Non-patent document 2]: "Adaptive Frequency-Domain Equalization for Single-Carrier Multiple-Input Multiple-Output Wireless Transmissions", J. Coon, S. Armour, M. Beach, and J. McGeehan, IEEE Trans. Signal Processing, vol. 53, pp. 3247-3256, August 2005.

[Non-patent document 3]: "Fundamental Studies on MIMO-OFDM Space Division Multiplexing", Nishio, Ogawa, Nishimura, and Ohgane, IEICE Tech. Rep., IEICE, DSP2002-204, SAT-2002-154, RCS2002-273, January 2003.

DISCLOSURE OF THE INVENTION

Problem to be Solved by the Invention

When signals are being transmitted from a plurality of transmitting stations, the timing of the signal transmissions is independently controlled by each transmitting station. In cases such as this, the arrival timings of the signals transmitted from the respective transmitting stations are different.

In multi-user MIMO which employs single-carrier transmissions or multicarrier transmissions which are based on the related art, the transmitted signals are formed into blocks which are made up of N number of signals in the case of a single-carrier transmission or Nc number of signals in the case of a multicarrier transmission, and, as is shown in FIG. 22, Ng number of guard intervals (GI) are inserted into each block and transmitted. If the insertion times Tg of these GI are larger than the maximum timing offset Tu at which transmitted signals between users (i.e., terminal stations) arrive (Tg≧Tu), because the orthogonality of the frequency component of the received signals with other signals is maintained, signal separation is possible.

However, if the insertion times Tg of the GI are smaller than the maximum timing offset Tu at which transmitted signals between users (i.e., terminal stations) arrive (Tg<Tu), because the orthogonality with other received signals is destroyed and it is not possible to properly separate signals, the problem arises that there is a considerable deterioration in performance. Accordingly, in the case of multi-user MIMO which employs single-carrier transmissions or multicarrier transmissions which are based on the related art, when signals from a plurality of transmitting stations arrive at receiving stations at different reception timings which exceed the GI length, it has been difficult to find a method of separating the signals from the plurality of users.

The present invention was conceived in view of the above described circumstances, and it is an object thereof to provide a reception device, a transmission device, a radio transmission/reception system, and a radio reception method that make it possible to reduce the effects of different reception timing offsets from a plurality of transmitting stations while reducing to a minimum any increase in the size of hardware.

Means for Solving the Problem

A reception device of the present invention is the reception device which receives a plurality of radio signals transmitted from a transmission device which is provided with either one or a plurality of antenna elements by means of a plurality of antenna elements, comprising: a first orthogonal conversion unit which performs orthogonal conversion on N number (wherein N>1) of time series data extracted from the radio signals received by the respective antenna elements; a detection unit which extracts transmitted signals from the respective antenna elements of the transmission devices from N number (wherein N>1) of signals which have been orthogonally converted by the first orthogonal conversion unit; an inverse orthogonal conversion unit which performs inverse orthogonal conversion on the transmitted signals extracted by the detection unit; and a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number (wherein Nw=N−Mh−Mt≧1) of time series data.

The reception device of the present invention may further comprise a second orthogonal conversion unit which performs orthogonal conversion on Nc number (wherein Nc>1) of multicarrier symbols from the time series data extracted by the rectangular filter unit, and a demodulation unit which performs decoding on each orthogonal component of the Nc number of orthogonal components which have been orthogonally converted by the second orthogonal conversion unit.

In the reception device of the present invention, after the first orthogonal conversion unit has extracted N number of time series data starting from an $A^{th}$ radio signal received by the respective antenna elements, the first orthogonal conversion unit may extract N number of time series data starting from the $(A+Nw)^{th}$ radio signal, and may connect a plurality of the Nw number of time series data output from the rectangular filter unit in time series sequence so as to use them as the transmitted signals.

The reception device of the present invention may further comprise a multi-user detection weight calculation unit which, based on impulse responses from the antenna elements of the transmission devices to each of its own antenna elements, calculates multi-user detection weights which are used as parameters when the transmitted signals from each transmission device are extracted by the detection unit.

The reception device of the present invention may further comprise an adjustment unit which, based on radio signals from the transmission device having the greatest interference, adjusts the value of at least one or more of the N, the Mh, the Mt, or the Nw.

In the reception device of the present invention, the Nw and the N may have a mutual relationship whereby $Nw=(2^n \cdot n \cdot \ln 2)/(1+n \cdot \ln 2)$ (wherein $N=2^n$, and n is an optional positive number).

The reception device of the present invention may further comprise a signal determination unit which performs soft decision or hard decision on the Nc number of orthogonal components which have been orthogonally converted by the second orthogonal conversion unit, and outputs Nc number of determination results; and a successive interference cancel unit which, based on time series data output from the rectangular filter unit, removes interference components from the radio signals received by the respective antenna elements using the Nc number of output signals orthogonally converted by the second orthogonal conversion unit and the determination signals determined by the signal determination unit, and signals which are output from the successive interference cancel unit are input into the first orthogonal conversion unit.

The reception device of the present invention may further comprise a successive interference cancel unit which, based on time series data output from the rectangular filter unit, removes interference components from the radio signals received by the respective antenna elements, and signals which are output from the successive interference cancel unit are demodulated.

The reception device of the present invention may further comprise a symbol deinterleaver unit which performs deinterleaving on symbol blocks formed by Nw/2 vertically and Nx (wherein Nx is an optional positive number) horizontally for the output from the rectangular filter unit.

A transmission device of the present invention is the transmission device which comprises either one or a plurality of antenna elements, and which transmits radio signals using these antenna elements, comprising a symbol interleaver unit which performs interleaving on symbol blocks formed by Nw/2 vertically and Nx (wherein Nx is an optional positive number) horizontally for signal sequence which have undergone serial-to-parallel conversion.

A radio transmission/reception system of the present invention is the radio transmission/reception system which comprises either one or a plurality of transmission devices which comprise either one or a plurality of antenna elements, and which transmit radio signals using these antenna elements, and reception device which comprises a plurality of antenna elements, and which receives a plurality of radio signals transmitted from the transmission devices, wherein the reception device comprises: a first orthogonal conversion unit which performs orthogonal conversion on N number (wherein N>1) of time series data extracted from the radio signals received by the respective antenna elements; a detection unit which extracts transmitted signals from the respective antenna elements of the transmission devices from N number (wherein N>1) of signals which have been orthogonally converted by the first orthogonal conversion unit; an inverse orthogonal conversion unit which performs inverse orthogonal conversion on the transmitted signals extracted by the detection unit; and a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number (wherein Nw=N−Mh−Mt≧1) of time series data.

In the radio transmission/reception system of the present invention, the transmission devices may comprise a symbol interleaver unit which performs interleaving on symbol blocks formed by Nw/2 vertically and Nx (wherein Nx is an optional positive number) horizontally for signal sequence which have undergone serial-to-parallel conversion, and the reception device may further comprise a symbol deinterleaver unit which performs deinterleaving on symbol blocks formed by Nw/2 vertically and Nx (wherein Nx is an optional positive number) horizontally for the output from the rectangular filter unit.

In the radio transmission/reception system of the present invention, the reception device may further comprise: a second orthogonal conversion unit which performs orthogonal conversion on Nc number of multicarrier symbols from the time series data extracted by the rectangular filter unit; and a demodulation unit which performs decoding on each orthogonal component of the Nc number (wherein Nc>1) of orthogonal components which have been orthogonally converted by the second orthogonal conversion unit.

A radio reception method of the present invention is the radio reception method in which a plurality of radio signals transmitted from a transmission device which comprises either one or a plurality of antenna elements are received by a reception device which comprises a plurality of antenna elements, comprising: first orthogonal converting in which orthogonal conversion is performed on N number (wherein N>1) of time series data extracted from the radio signals received by the respective antenna elements; detecting in which transmitted signals transmitted from the respective antenna elements of the transmission devices are extracted from N number (wherein N>1) of signals which have been orthogonally converted in the first orthogonal converting; inverse orthogonal converting in which inverse orthogonal conversion is performed on the transmitted signals extracted in the detecting; and rectangular filtering in which Mh number of time series data are removed from the front end portion and Mt number of time series data are removed from the rear end portion of the transmitted signals which have been extracted in the inverse orthogonal converting, so as to extract Nw (wherein Nw=N−Mh−Mt≧1) number of time series data.

The radio reception method of the present invention may further comprise second orthogonal converting in which orthogonal conversion is performed on Nc (wherein Nc>1) number of multicarrier symbols from the Nw number of time series data, and demodulating in which decoding is performed on each orthogonal component of the Nc number of orthogonal components which have been orthogonally converted.

Effect of the Invention

According to the present invention, in the case of a multi-user MIMO which uses single-carrier transmissions, first orthogonal conversion is performed on N number (wherein N>1) of time series data extracted from radio signals received by the respective antenna elements; transmitted signals are extracted from the respective transmission devices from among the N number (wherein N>1) of signals which have undergone the first orthogonal conversion; inverse orthogonal conversion is performed on the extracted transmitted signals; and Mh number of time series data are removed from the front end portion and Mt number of time series data are removed from the rear end portion of the transmitted signals which have undergone inverse orthogonal conversion, so as to extract Nw (wherein Nw=N−Mh−Mt≧1) number of time series data. Moreover, in the case of a multi-user MIMO which uses multicarrier transmissions, a further second orthogonal conversion is performed on a multicarrier symbol formed by Nc number of transmission symbols from among the extracted time series data; and decoding is performed on each orthogonal component of the Nc number (wherein Nc>1) of orthogonal components which have undergone the second orthogonal conversion.

Accordingly, the advantage is obtained that it is possible to reduce the effects of different reception timing offsets from a plurality of transmitting stations while reducing to a minimum any increase in the scale of hardware.

Moreover, according to the present invention, after interleaving has been performed on symbol blocks formed by Nw/2 vertically and Nx (wherein Nx is an optional positive number) horizontally for signal sequence which have undergone serial-to-parallel conversion, either one or a plurality of radio signals are transmitted from either one or a plurality of antenna elements. By using the above described interleaver and deinterleaver, because burst errors caused by the effects of interference are changed to random errors, and the advantage is obtained that it is possible to obtain the optimum error correction performance when the above described system is used.

BRIEF DESCRIPTION OF THE DRAWINGS

FIG. 11 is a conceptual view showing an example of order of a demodulation performed by the successive interference cancel device 1514 according to the first embodiment.

REFERENCE SYMBOLS

Figure 1:
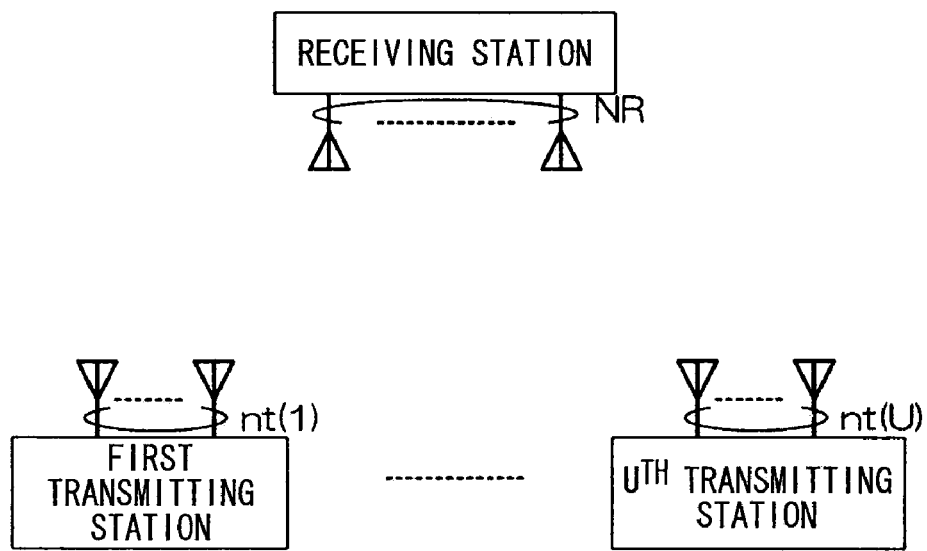
FIG. 1 is a system structural view showing a radio communication system according to the present invention.

1100-$u$ Error correction encoder
1101-$u$ Interleaver circuit
1102-$u$ Modulator
1103-$u$ Serial-to-parallel converter
1104-$u$-1 to 1104-$u$-$nt$ (u) Wavelength shaping circuits
1105-$u$-1 to 1105-$u$-$nt$ (u) D/A converters
1106-$u$-1 to 1106-$u$-$nt$ (u) Radio sections
1107-$u$-1 to 1107-$u$-$nt$ (u) Transmitter antennas
1109-1 to 1109-NR Receiver antennas
1110-1 to 1110-NR Radio sections
1111-1 to 1111-NR A/D converters
1112-1 to 1112-NR Memories
1113-1 to 1113-NR Orthogonal converters (First orthogonal conversion sections)
1114-1 to 1114-N Multi-user detectors (detection sections)
1115-1 to 1115-NR Inverse orthogonal converters (Inverse orthogonal conversion sections)
1116-1 to 1116-NR Rectangular filter circuits (Rectangular filter sections)
1117-1 to 1117-U Parallel-to-serial converters
1118-1 to 1118-U Demodulators
1119-1 to 1119-U Deinterleaver circuits
1120-1 to 1120-U Decoders
1121 Multi-user detection weight calculator (Multi-user detection weight calculation section)
1401-1-1-1 to 1401-NR-U-nt (U) Channel impulse response estimation sections
1402-1-1-1 to 1402-NR-U-nt (U) Channel transfer function estimation sections
1403-1-1-1 to 1403-NR-U-nt (U) IBI contribution matrix estimation sections
1404-1 to 1404-NR Noise power estimation sections
1405 Multi-user detection weight calculation section
1510-1 to 1510-NR Receiver antennas
1511-1 to 1511-NR Radio sections
1512-1 to 1512-NR A/D converters
1513-1 to 1513-NR Memories
1514 Successive interference cancel device (Successive interference cancel section)
1515-1 to 1515-U Parallel-to-serial converters
1516-1 to 1516-U Deinterleaver circuits
1517-1 to 1517-U Decoders
1518 Weight calculator for successive interference cancel device
1601-1 to 1601-NR Interference subtractors
1602-1-1 to 1602-NT-NR Orthogonal converters (First orthogonal conversion sections)
1603-1 to 1603-NT Signal detectors
1604-1 to 1604-NT Inverse orthogonal converters (Inverse orthogonal conversion sections)
1605-1 to 1605-NT Rectangular filter circuits (Rectangular filter sections)
1606-1 to 1606-NT Signal determination sections
1607-1 to 1607-NT Delay circuits
1608 Replica generation circuit
1609-1-1 to 1609-(NT−1)-NR Interference subtractors
1610-1 to 1610-(NT−1) Replica generation circuits
2101-$u$ Error correction encoder
2102-$u$ Interleaver circuit
2103-$u$ First serial-to-parallel converter
2104-$u$-1 to 2104-$u$-$nt$ (u) Second serial-to-parallel converters
2105-$u$-1-1 to 2105-$u$-$nt$ (u)-Nc Modulators
2106-$u$-1 to 2106-$u$-$nt$ (u) Inverse orthogonal converters
2107-$u$-1 to 2107-$u$-$nt$ (u) Waveform shaping circuits
2108-$u$-1 to 2108-$u$-$nt$ (u) D/A converters
2109-$u$-1 to 2109-$u$-$nt$ (u) Radio sections
2110-$u$-1 to 2110-$u$-$nt$ (u) Transmitter antennas
2201-1 to 2201-NR Receiver antennas
2202-1 to 2202-NR Radio sections
2203-1 to 2203-NR A/D converters
2204-1 to 2204-NR First memories
2205-1 to 2205-NR First orthogonal converters (First orthogonal conversion sections)
2206-1 to 2206-N Multi-user detectors (detection sections)
2207-1 to 2207-NT Inverse orthogonal converters (Inverse orthogonal conversion sections)
2208-1 to 2208-NT Rectangular filter circuits (Rectangular filter sections)
2209-1 to 2209-NT Second memories
2210-1 to 2210-NT Second orthogonal converters (Second orthogonal conversion sections)
2211-1-1 to 2211-NT-Nc Demodulators (demodulation sections)
2212-1 to 2212-NT First parallel-to-serial converters
2213-1 to 2213-U Second parallel-to-serial converters
2214-1 to 2214-U Deinterleaver circuits
2215-1 to 2215-U Decoders
2220 Multi-user detection weight calculator (Multi-user detection weight calculation section)
2401-1-1-1 to 2401-NR-U-nt (U) Channel impulse response estimation sections
2402-1-1-1 to 2402-NR-U-nt (U) Channel transfer function estimation sections
2403-1-1-1 to 2403-NR-U-nt (U) IBI contribution matrix estimation sections
2404-1 to 2404-NR Noise power estimation sections
2405 Multi-user detection weight calculation section
2510-1 to 2510-NR Receiver antennas
2511-1 to 2511-NR Radio sections
2512-1 to 2512-NR A/D converters
2513-1 to 2513-NR Memories
2514 Successive interference cancel device (Successive interference cancel section)
2515-1 to 2515-U Parallel-to-serial converters
2516-1 to 2516-U Demodulators
2517-1 to 2517-U Decoders
2518 Weight calculator for successive interference cancel device
2601-1 to 2601-NR First interference subtractors
2602-1-1 to 2602-NT-NR First orthogonal converters (First orthogonal conversion sections)
2603-1 to 2603-NT Signal detectors
2604-1 to 2604-NT Inverse orthogonal converters (Inverse orthogonal conversion sections)
2605-1 to 2605-NT Rectangular filter circuits (Rectangular filter sections)
2606-1 to 2606-NT Memories
2607-1 to 2607-NT Second orthogonal converters
2608-1-1 to 2608-NT-Nc Signal determination sections
2609-1 to 2609-NT Parallel-to-serial converters
2610-1 to 2610-NT Delay circuits
2611 Replica generation circuit
2612-1-1 to 2612-(NT−1)-NR Second interference subtractors
2613-1 to 2613-(NT−1) Replica generation circuits

BEST MODE FOR CARRYING OUT THE INVENTION

Embodiments of the present invention will now be described with reference made to the drawings.

[Basic Principle of the Present Invention]

The basic principle of the present invention will now be described.

FIG. 1 is a block diagram showing the structure of a radio communication system which serves as an embodiment of the present invention. As is shown in FIG. 1, this radio communication system is a network in which a plurality of transmitting stations (i.e., a first transmitting station . . . a $U^{th}$ transmitting station) and a receiving station are mutually connected. The respective transmitting stations and the receiving station are each equipped with either one or a plurality of antennas.

Figure 2:
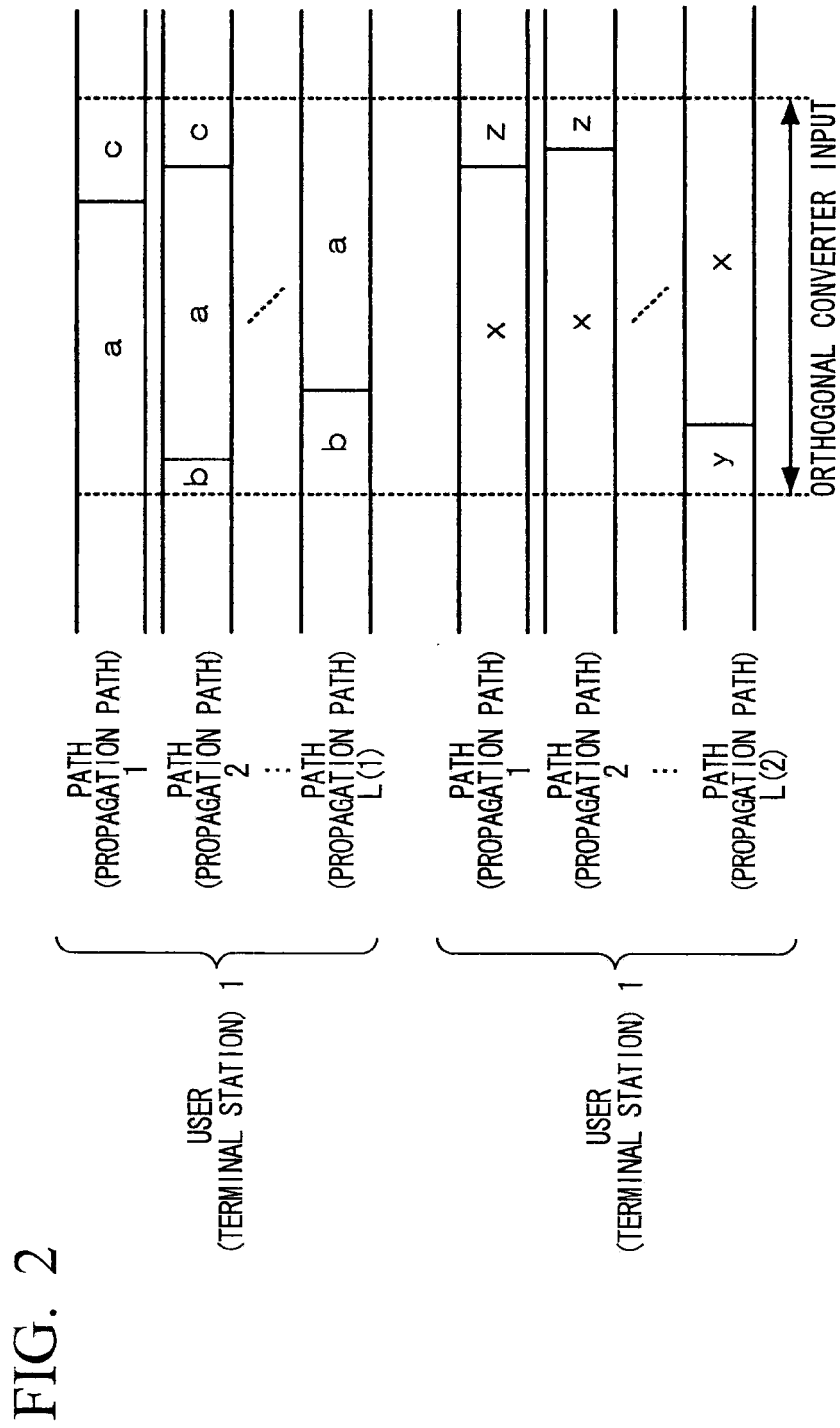
FIG. 2 is a conceptual view showing an example of received signal sequence in order to illustrate the basic principle of the present invention.
Figure 3:
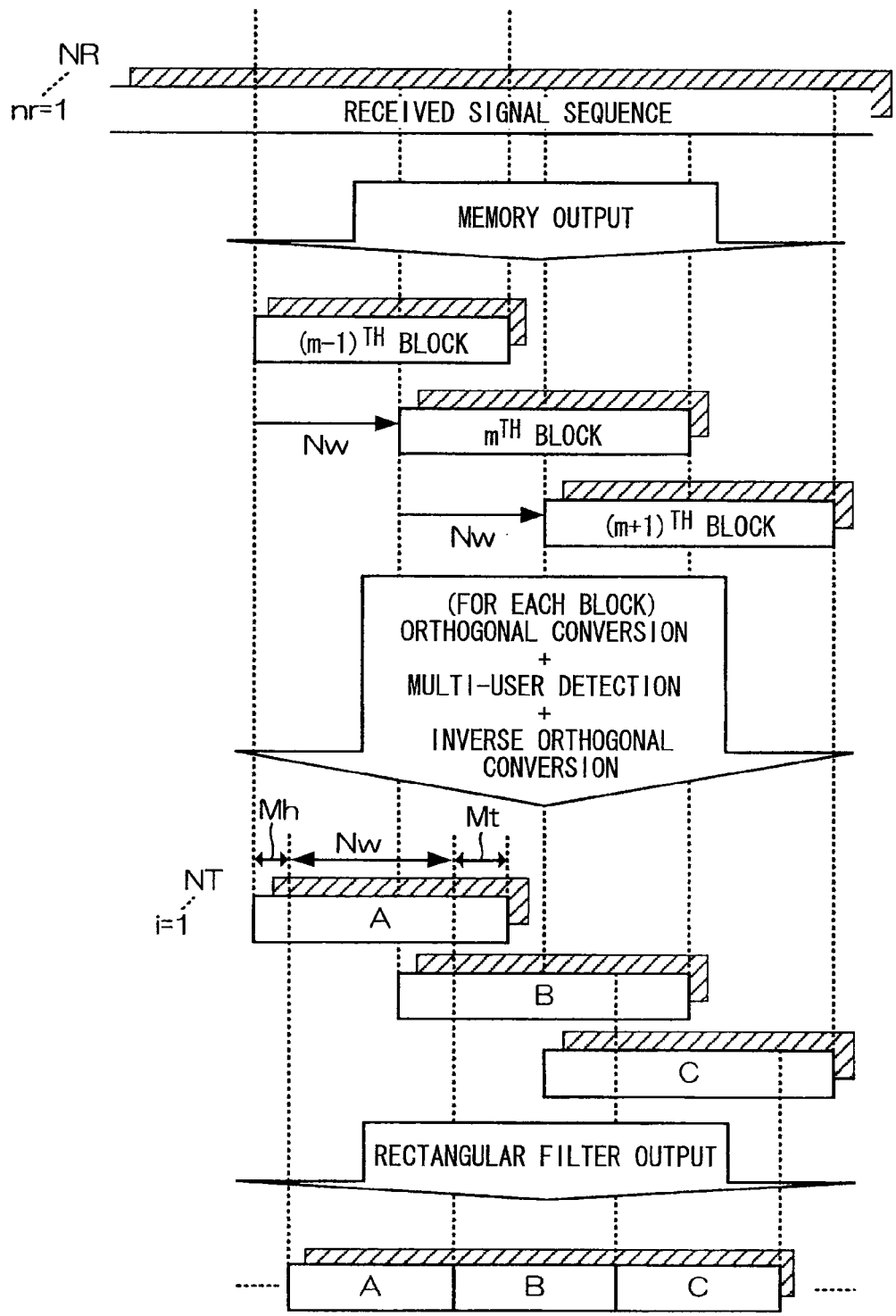
FIG. 3 is a conceptual view showing an example of multi-user detection used in an overlap-cut method.

FIG. 2 is a conceptual view showing an example of received signal sequence in order to illustrate the basic principle of the present invention. FIG. 3 is a conceptual view showing an example of multi-user detection used in an overlap-cut method. Note that FIG. 2 shows a received signal sequence in which the number of users is two, the number of transmitter antennas for each user is one, and the path numbers (i.e., the number of propagation paths) for User 1 and User 2 are taken as L (1) and L (2) respectively. On the receiving side, as is shown in FIG. 2, signals from all the users which have arrived via propagation paths which are formed from a plurality of paths having different delays are received overlapping each other.

If orthogonal conversion is performed on the above received signals with N number of signals taken as input values within a range such as that shown in FIG. 2, then the cyclicity of the signals in the 'a' portion for User 1, and in the x portion for User 2 is maintained. In contrast, because cyclicity is not maintained in the portions b, c, y, and z, interblock interference (IBI) is generated. Accordingly, the IBI components after signal separation has been performed by means of multi-user detection do not spread over all of the block segments which are formed by the N number of signals, and principally only the signals in the vicinity of both ends of the block are affected. Therefore, in the case of a single-carrier transmission, as is shown in the bottom portion in FIG. 3, by extracting only the Nw signals in the center portion of the block A where there is little IBI effect and then demodulating these signals, the effects of IBI are avoided. In contrast, in the case of a multicarrier transmission, as is shown in the bottom portion in FIG. 3, by only extracting the Nw signals in the center portion of the block A where there is little IBI effect and then performing orthogonal conversion for each multicarrier symbol on a signal sequence obtained by joining these Nw signals together and then demodulating this signal sequence, the effects of IBI are avoided. Here, a multicarrier symbol indicates the signal of one block portion obtained by performing inverse orthogonal conversion on Nc number of transmitted symbols in the transmitting station.

The entire transmitted signal sequence is demodulated by performing the above described operation as shown in FIG. 3, while overlapping inputs from the orthogonal converters in the case of a single-carrier transmission, or from the first orthogonal converter in the case of a multicarrier transmission. Moreover, if the weight which is used for the multi-user detection is exactly the same as a conventional weight, then because no consideration is given to the effects of residual IBI, it is not possible to satisfactorily suppress interference. Because of this, there is a considerable deterioration in performance. Therefore, in the present invention, by using a multi-user weight which has been derived in the manner described below, it is possible to obtain a superior performance.

Next, a description of the basic principle of the present invention will be described using mathematical formulae. Note that, in the description given below, the superscript T indicates a transpose, the superscript H indicates a complex conjugate transpose, the superscript * indicates a complex conjugate, $\alpha \times \beta$ indicates a matrix of $\alpha$ rows and $\beta$ columns, and E [.] indicates an ensemble average. Moreover, unit matrices of a rows and a columns are expressed by the following Formula (2), zero matrices of $\alpha$ rows and $\beta$ columns are expressed by the following Formula (3), and elements in row p column q of a matrix (or vector) A are represented expressed by the following Formula (4).

[Formula 2]

$$I_\alpha \qquad (2)$$

[Formula 3]

$$0_{\alpha \times \beta} \qquad (3)$$

[Formula 4]

$$[A]_{p,q} \qquad (4)$$

(Weight Derivation)

Firstly, a description of a received signal will be given.

An N×1 input signal vector $r_{nr} = [r_{nr}((m-1)Nw+1), \ldots, r_{nr}((m-1)Nw+N)]^T$ which is input into the $m^{th}$ orthogonal converter in a single-carrier transmission or into the $m^{th}$ first orthogonal converter in a multicarrier transmission in a received signal (i.e., time series) received by an $nr^{th}$ receiver antenna is expressed by the following Formula (5).

[Formula 5]

$$r_{nr}(m) = \sum_{u=1}^{U} \sum_{i=1}^{nt(u)} \{\tilde{H}_{nr,u,i}(m)s_{u,i}(m) + X_{nr,u,i}(m)u_{u,i}(m) + Y_{nr,u,i}(m)v_{u,j}(m)\} + n_{nr}(m) \qquad (5)$$

Here, the tilde (~) $H_{nr,u,i}(m)$ is a channel response matrix between the $i^{th}$ transmitter antenna of the $u^{th}$ transmitting station and the $nr^{th}$ receiver antenna, and the initial column is the N×N circuit matrix of the $h_{nr,u,i}(m) = h_{0,nr,u,i}(m), \ldots, h_{L(u)-1,nr,u,i}(m), 0_{1 \times (N-L(u))})^T$. The tilde (~) $H_{nr,u,i}(m)$ is provided by the following Formula (6).

[Formula 6]

$$\tilde{H}_{nr,u,i}(m) = \begin{bmatrix} h_{0,nr,u,i}(m) & 0 & \cdots & \cdots & 0 & h_{L(u)-1,nr,u,i}(m) & \cdots & h_{1,nr,u,i}(m) \\ h_{1,nr,u,i}(m) & \ddots & \ddots & & \vdots & & \ddots & \vdots \\ \vdots & & & & & & & h_{L(u)-1,nr,u,i}(m) \\ h_{L(u)-1,nr,u,i}(m) & \ddots & & & & & & 0 \\ 0 & \ddots & & 0 & & & & \vdots \\ \vdots & & & h_{0,nr,u,i}(m) & & & & \\ & & & h_{1,nr,u,i}(m) & h_{0,nr,u,i}(m) & \ddots & & \vdots \\ \vdots & & \ddots & \vdots & h_{1,nr,u,i}(m) & \ddots & & 0 \\ 0 & \cdots & \cdots & 0 & h_{L(u)-1,nr,u,i}(m) & \vdots & \cdots & h_{0,nr,u,i}(m) \end{bmatrix} \quad (6)$$

Note that L (u) is the number of channel impulse responses between the $u^{th}$ MT and the AP.

Moreover, the vector $S_{u,i}$ (m) is a time series vector of the N×1 desired transmitted signal which is transmitted from the $i^{th}$ transmitter antenna of the $u^{th}$ MT, while the vector $n_{nr}$(m) is a time series vector of the N×1 noise of the $nr^{th}$ receiver antenna, and these are provided respectively by the following Formulas (7) and (8).

[Formula 7]

$$s_{u,i}(m) = (s_{u,i}((m-1)Nw+1-\tau(u)), \ldots, s_{u,i}((m-1)Nw+N-\tau(u)-Nd(u)), 0_{1\times(N-Nd(u))})^T \quad (7)$$

[Formula 8]

$$n_{nr}(m) = n_{nr}((m-1)Nw+1), \ldots, n_{nr}((m-1)Nw+N))^T \quad (8)$$

Wherein Formulas (9) and (10) are as follows.

[Formula 9]

$$E[s_{u,i}(n)s^*_{u',i'}(n')] = \begin{cases} 1, & (u, i, n) = (u', i', n') \\ 0, & \text{otherwise} \end{cases} \quad (9)$$

[Formula 10]

$$E[n_{nr}(n)n^*_{nr'}(n')] = \begin{cases} 2\sigma^2_{nr}, & (nr, n) = (nr', n') \\ 0, & \text{otherwise} \end{cases} \quad (10)$$

Note that Nd(u) (=N−L(u)+1) is the number of signals whose cyclicity has not broken down inside the block in the $i^{th}$ antenna of the $u^{th}$ transmitting station, and $2\sigma^2_{nr}$ indicates the noise variance in the $nr^{th}$ receiver antenna. τ(u) is the delay time between the $u^{th}$ MT and AP.

$X_{nr,u,i}$(m) and $u_{u,i}$(m) are respectively the N×(L(u)−1) channel matrix of the IBI and the (L(u)−1)×1 signal component vector from the signal immediately prior. Moreover, $Y_{nr,u,i}$(m) and $v_{u,i}$(m) are respectively the N×(L(u)−1) channel matrix of the IBI and the (L(u)−1)×1 signal component vector from the signal immediately after. These are provided respectively by the following Formulas (11), (12), (13), and (14).

[Formula 11]

$$X_{nr,u,i}(m) = \begin{bmatrix} h_{L(u)-1,nr,u,i}(m) & h_{L(u)-2,nr,u,i}(m) & \cdots & h_{1,nr,u,i}(m) \\ 0 & \ddots & & h_{2,nr,u,i}(m) \\ \vdots & & \ddots & \vdots \\ 0 & \cdots & 0 & h_{L(u)-1,nr,u,i}(m) \\ & & 0_{Nd(u),L(u)-1} & \end{bmatrix} \quad (11)$$

[Formula 12]

$$u_{u,i}(m) = \begin{bmatrix} s_{u,i}((m-1)Nw - L(u) + 2 - \tau(u)) \\ \vdots \\ s_{u,i}((m-1)Nw - \tau(u)) \end{bmatrix} \quad (12)$$

[Formula 13]

$$Y_{nr,u,i}(m) = \begin{bmatrix} & 0_{Nd(u),L(u)-1} & & \\ h_{0,nr,u,i}(m) & 0 & \cdots & 0 \\ h_{1,nr,u,i}(m) & \ddots & \ddots & \vdots \\ \vdots & & & 0 \\ h_{L(u)-2,nr,u,i}(m) & h_{L(u)-3,nr,u,i}(m) & \cdots & h_{0,nr,u,i}(m) \end{bmatrix} \quad (13)$$

[Formula 14]

$$v_{u,i}(m) = \begin{bmatrix} s_{u,i}((m-1)Nw + Nd(u) + 1 - \tau(u)) \\ \vdots \\ s_{u,i}((m-1)Nw + N - \tau(u)) \end{bmatrix} \quad (14)$$

In the receiver, firstly, N point orthogonal conversion is applied, and the received signal is decomposed into N components. A $k^{th}$ orthogonal component vector r (m, k) of the NR×1 received signal is provided by the following Formula (15).

[Formula 15]

$$r(m, k) = (f(k)[r_1(m), r_2(m), \ldots, r_{NR}(m)])^T \quad (15)$$
$$= H(m, k)s(m, k) + c(m, k) + n(m, k)$$

Here, H (m, k), s (m, k), c (m, k) and n (m, k) are respectively the NR×NT channel transfer function matrix at the $k^{th}$ frequency point, the NT×1 transmitted signal vector, the NR×1 IBI component vector, and the NR×1 noise vector. These respective matrices and vectors are provided by the following Formula (16).

Figure 4:
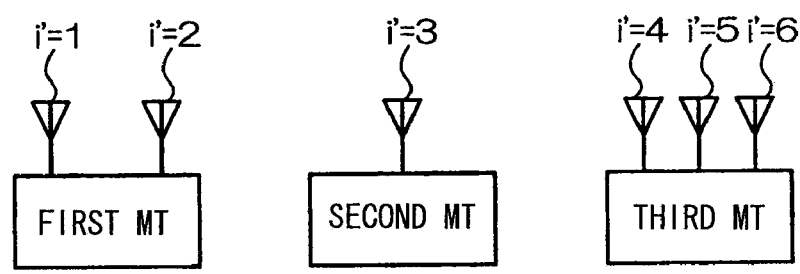
FIG. 4 is a block diagram showing an example of a case in which there are three MT and the number of antennas of the first MT is two, the number of antennas of the second MT is one, and the number of antennas of the third MT is three.

[Formula 16]

$$[H(m, k)]_{nr,i'} = f(k)h_{nr,u,i}(m) \quad (16)$$

$$[s(m, k)]_{i',1} = f(k)s_{u,i}(m)$$

$$[c(m, k)]_{nr,1} = \sum_{u=1}^{U}\sum_{i=1}^{nt(u)} f(k)\{X_{nr,u,i}(m)u_{u,i}(m) + Y_{nr,u,i}(m)v_{u,i}(m)\}$$

$$[n(m, k)]_{nr,1} = f(k)n_{nr}(m)$$

Wherein i' is expressed by the following Formula (17), and represents an index of the $i^{th}$ antenna of the $u^{th}$ MT. An example in which, for example, the number of MT is three, the number of antennas of the first MT is two, the number of antennas of the second MT is one, and the number of antennas of the third MT is three is shown in FIG. 4.

[Formula 17]

$$i' = \left[\sum_{u'=1}^{u-1} nt(u')\right] + i \quad (1 \le i \le nt(u)) \quad (17)$$

The vector f(k) is the 1×N orthogonal conversion vector, and is provided by the following Formula (18).

[Formula 18]

$$f(k)=[e(k,1), \ldots, e(k,N)] \quad (18)$$

Multi-user detection is performed in the respective orthogonal components for the orthogonal components of the received signals as is shown by the following Formula (19).

[Formula 19]

$$b(m, k) = (b_1(m, k), \ldots, b_{NT}(m, k))^T \quad (19)$$
$$= W^H(m, k)r(m, k)$$

In the present invention, as an example, when the channel impulse response has been provided, a weight which minimizes any discrepancy between an orthogonal component vector b (m, k) of a received signal after multi-user detection and the orthogonal component vector s (m, k), namely, which is based on minimum mean square error (MMSE) criteria is used. W (m, k) is a weight which is based on MMSE criteria in the $k^{th}$ orthogonal component, and is provided by the following Formula (20).

[Formula 20]

$$W(m, k) = \arg\min_{W(m,k)} E[\|s(m, k) - b(m, k)\|^2] \quad (20)$$

Here, $\|A\|^2$ represents the square of the norm of Matrix A.

Next, the vector W (m, k) is taken as the Wiener solution (reference document: "Adaptive Signal Processing using Array Antennas", Kikuma, 1998) and can be determined as is shown by the following Formula (21).

[Formula 21]

$$W(m,k)=R^{-1}(m,k)Q(m,k) \quad (21)$$

Here, R (m, k) is an auto-correlation matrix of the received signal vector r (m, k), Q (m, k) represents a cross-correlation matrix between the received signal vector r (m, r) and the desired signal vector s (m, k), and is expressed by the following Formula (22).

[Formula 22]

$$\begin{cases} R(m, k) = E[r(m, k)(r(m, k))^H] \\ Q(m, k) = E[r(m, k)(s(m, k))^H] \end{cases} \quad (22)$$

The auto-correlation matrix R (m, k) is found using the following Formula (23).

[Formula 23]

$$R(m,k)=H(m,k)P(H(m,k))^H+\tilde{C}(m,k)+\mathrm{diag}(2\sigma_1^2,\ldots,2\sigma_{NR}^2) \quad (23)$$

Here, the matrix P is provided by the following Formula (24).

[Formula 24]

$$P = \mathrm{diag}(P_1, \ldots, P_{NT}) \quad (24)$$
$$P_{i'} = \frac{Nd(u)}{N}$$

Moreover, the (p, q) element [tilde(~) C(m, k)]$_{p, q}$ of the second expression tilde (~) C(m, k) is found by the following Formula (25).

[Formula 25]

$$\begin{aligned}\left[\tilde{C}(m, k)\right]_{p,q} &= E[c(m, k)(c(m, k))^H] \\ &= E\left[\begin{array}{l}\sum_{u=1}^{U}\sum_{i=1}^{nt(u)} f(k)\{X_{p,u,i}(m)u_{u,i}(m) + Y_{p,u,i}(m)v_{u,i}(m)\} \times \\ \left\{\sum_{u'=1}^{U}\sum_{i'=1}^{nt(u)} f(k)\{X_{q,u',i'}(m)u_{u',i'}(m) + Y_{q,u',i'}(m)v_{u',i'}(m)\}\right\}^*\end{array}\right] \\ &= \sum_{u=1}^{U}\sum_{i=1}^{nt(u)}\{f(k)X_{p,u,i}(m)(f(k)X_{q,u,i}(m))^H + f(k)Y_{p,u,i}(m)(f(k)Y_{q,u,i}(m))^H\}\end{aligned} \quad (25)$$

The cross-correlation matrix Q (m, k) is found by the following Formula (26).

[Formula 26]

$$Q(m, k) = E[(H(m, k)s(m, k) + c(m, k) + n(m, k))s^H(m, k)] \quad (26)$$
$$= H(m, k)P(m)$$

Accordingly, when the channel matrix H (m, k) is provided, the multi-user detection MMSE weight W (m, k) which is being determined is found by the following Formula (27).

[Formula 27]

$$w(m,k)=[H(m,k)PH^H(m,k)+\tilde{C}(m,k)+\text{diag}(2\sigma_1^2, \ldots, 2\sigma_{NR}^2)]^{-1}H(m,k)P \quad (27)$$

Moreover, at the receiving station, a weight which does not require an estimation of the noise power is found by the following Formula (28).

[Formula 28]

$$W(m,k)=[H(m,k)PH^H(m,k)+\tilde{C}(m,k)]^{-1}H(m,k)P \quad (28)$$

First Embodiment

When Single-Carrier Transmission is Used

Structure of the First Embodiment

Next, an embodiment of the present invention in which single-carrier transmission is used will be described.

Figure 5:
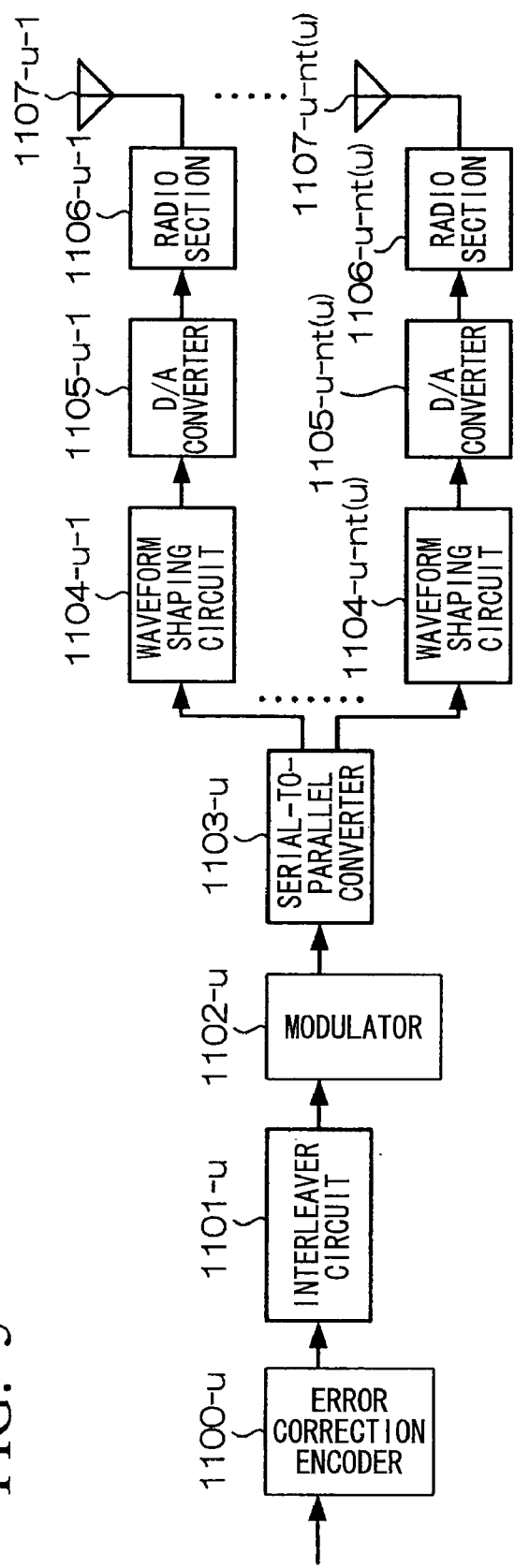
FIG. 5 is a block diagram showing the structure of a transmission system in a $u^{th}$ transmitting station according to the present embodiments.

FIG. 5 is a block diagram showing the structure of a transmission system in the $u^{th}$ transmitting station according to the present embodiment. In FIG. 5, 1100-$u$ is an error correction encoder of the $u^{th}$ transmitting station, 1101-$u$ is an interleaver circuit of the $u^{th}$ transmitting station, 1102-$u$ is a modulator of the $u^{th}$ transmitting station, 1103-$u$ is a serial-to-parallel converter of the $u^{th}$ transmitting station, 1104-$u$-1 through 1104-$u$-nt (u) are waveform shaping circuits of the $u^{th}$ transmitting station, 1105-$u$-1 through 1105-$u$-nt (u) are D/A converters of the $u^{th}$ transmitting station, 1106-$u$-1 through 1106-$u$-nt (u) are radio sections of the $u^{th}$ transmitting station, and 1107-$u$-1 through 1107-$u$-nt (u) are transmitter antennas of the $u^{th}$ transmitting station.

Figure 6:
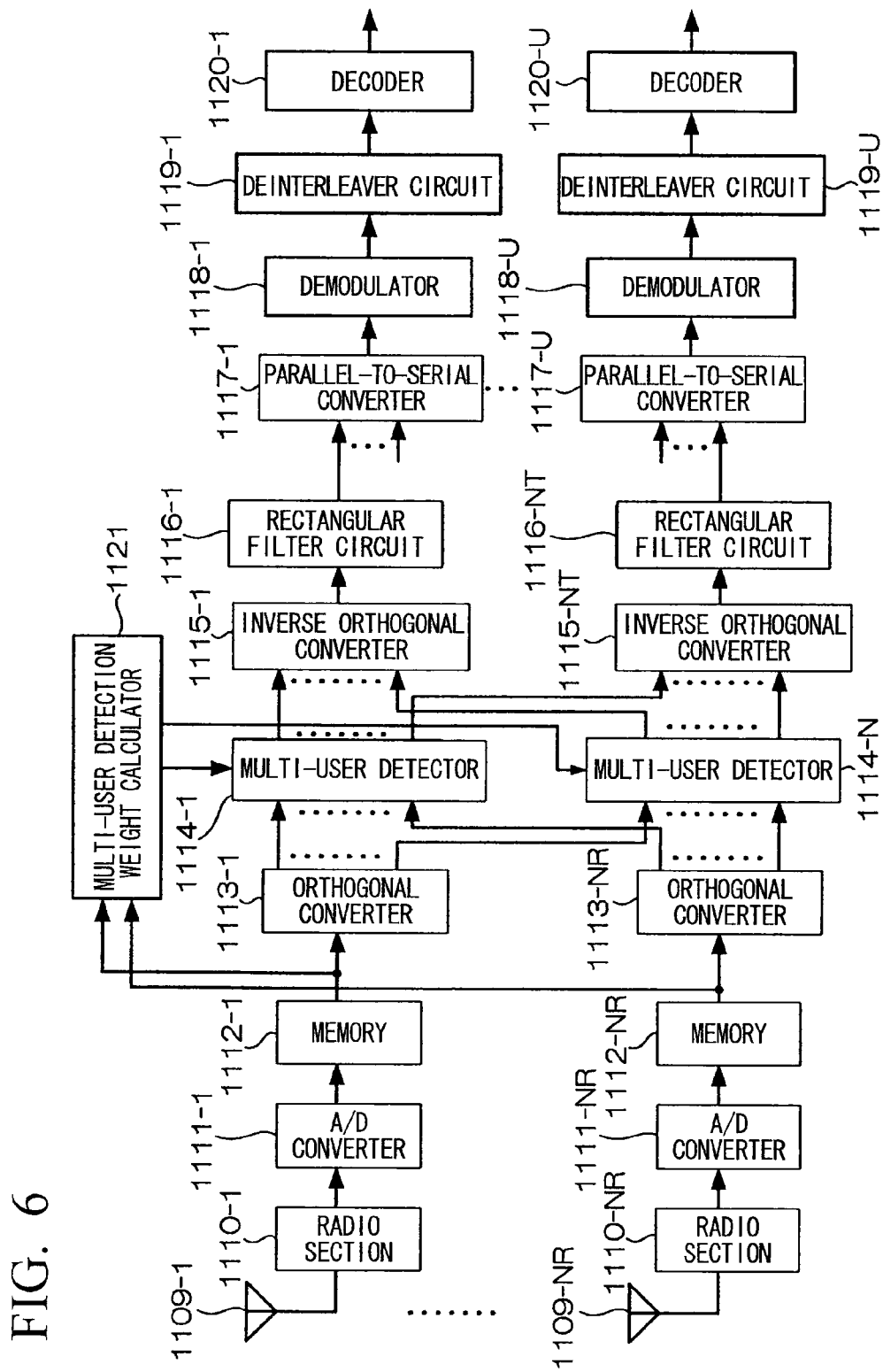
FIG. 6 is a block diagram showing the structure of a reception system according to a first embodiment.

Moreover, FIG. 6 is a block diagram showing the structure of a receiving system according to the present embodiment. In FIG. 6, 1109-1 through 1109-NR are receiver antennas, 1110-1 through 1110-NR are radio sections, 1111-1 through 1111-NR are A/D converters, 1112-1 through 1112-NR are memories, 1113-1 through 1113-NR are orthogonal converters, 1114-1 through 1114-N are multi-user detectors, 1115-1 through 1115-NT are inverse orthogonal converters, 1116-1 through 1116-NT are rectangular filter circuits, 1117-1 through 1117-U are parallel-to-serial converters, 1118-1 through 1118-U are demodulators, 1119-1 through 1119-U are deinterleaver circuits, and 1120-1 through 1120-U are decoders. In addition, 1121 is a multi-user detection weight calculator. Note that the bandwidth limiting filtering for signals on the receiving side can be performed anywhere between the radio sections 1110-1 through 1110-NR and the multi-user detectors 1114-1 through 1114-N.

Moreover, in the description given below, oversampling has not been assumed, however, as in the related art, it is also possible to perform oversampling in the A/D converters 1111-1 through 1111-NR. In this case, downsampling can be performed somewhere between the A/D converters 1111-1 through 1111-NR and the rectangular filter circuits 1116-1 through 1116-NT. If downsampling is performed somewhere between the memory 1112-1 through 1112-NR and the orthogonal converters 1113-1 through 1113-NR, then it is possible to reduce the scale of calculation of the signal processing on the receiving side. Moreover, if downsampling is performed somewhere between the multi-user detectors 1114-1 through 1114-N and the rectangular filter circuits 1116-1 through 1116-NT, then it is also possible to increase the desired signal power.

Furthermore, in the receiving station, it is possible to estimate the arrival timings of each transmitting station by means of a commonly used method. For example, predetermined timing detection training signals are inserted within the transmitted signals from each transmitting station, while in the receiving station, by correlating the received signals with the training signals, it is possible to estimate the arrival timings of each transmitting station.

It is also possible to allocate in advance a different timing detection training signal to each transmitting station. In addition to this, for each transmitting station it is possible to select at random a timing detection training signal from among a plurality of predetermined timing detection training signals, and then transmit this to that transmitting station.

In the receiving stations, a method may be employed in which a correlation with timing detection training signals is established only for signals received by antennas having the highest received signal levels, or alternatively, a method may be employed in which a correlation with the timing detection training signals is established for each signal received by the respective antennas, and these are then synthesized. By employing one of these methods, it is possible to detect transmission timings. This transmission timing detection may be achieved by means of a method which is performed for each frame, a method which is performed before communication starts, or a method which uses a timing estimated in the previous frame. Hereinafter, a detailed description is given of the operations in each communication frame with it being assumed that reception timings from each transmitting station have been estimated prior to the communication frame making the signal transmission.

Firstly, the transmitting side will be described. Here, the signal processing performed by the $u^{th}$ transmitting station will be described. Taking a binary data sequence transmitted by the $u^{th}$ transmitting station as an input signal, this input signal is supplied to the error correction encoder 1100-$u$. An encoded binary data sequence is output from the error correction encoder 1100-$u$. The output from the error correction encoder 1100-$u$ is input into the interleaver circuit 1101-$u$, and an interleaved data sequence is then output therefrom. Thereafter, the modulator 1102-$u$ modulates the interleaved data sequence, and supplies the modulated symbol sequence to the serial-to-parallel converter 1103-$u$. This is then converted into nt (u) number of series in the serial-to-parallel converter 1103-$u$ and is output.

Output signals which are formed by this nt (u) series are supplied to the waveform shaping circuits 1104-$u$-1 through 1104-$u$-nt (u). A bandwidth-limited signal sequence is then output for each series from the waveform shaping circuits 1104-$u$-1 through 1104-$u$-nt (u). The output signals from the waveform shaping circuits 1104-$u$-1 through 1104-$u$-nt (u) are input into the D/A converters 1105-$u$-1 through 1105-$u$-nt (u). Digital/analog conversion is then performed in the D/A converters 1105-$u$-1 through 1105-$u$-nt (u), and the resulting analog signals are then supplied to the radio sections 1106- u-1 through 1106-u-nt (u). These are then output as RF signals from the radio sections 1106-u-1 through 1106-u-nt (u), and are transmitted from the transmitter antennas 1107-u-1 through 1107-u-nt (u). The signal processing described above is performed in the same manner in all of the transmitting stations.

Next, the signal processing on the receiving side will be described. Signals received by the receiver antennas 1109-1 through 1109-NR are supplied to the radio sections 1110-1 through 1110-NR for each receiver antenna with the signal sequence thereof used as input signals. Frequency conversion is then performed in the radio sections 1110-1 through 1110-NR, and baseband signals are output. These baseband signals are input into the A/D converters 1111-1 through 1111-NR. Analog/digital conversion is conducted in the A/D converters 1111-1 through 1111-NR and the digital signals that are thereby obtained are stored in the memory 1112-1 through 1112-NR.

Thereafter, as is shown in FIG. 3, N number of signals of the signal sequence which are stored in the memory 1112-1 through 1112-NR are read and supplied to the orthogonal converters 1113-1 through 1113-NR with the lead position thereof shifted each time by Nw number of signals. In the $nr^{th}$ (wherein nr=1~NR) orthogonal converter 1113-nr, when the input signals (i.e., time series) which are input into the $m^{th}$ (wherein m is the block number) orthogonal converter 1113-m are taken as rnr ((m−1) Nw+1)~rnr((m−1)Nw+N), the output values (i.e., orthogonal components) are expressed by the following Formula (29) using N number of orthogonal signals e (k, n) having a length of N which are set in advance.

[Formula 29]

$$R_{nr}(m, k) = \sum_{n=1}^{N} e(k, n) r_{nr}((m-1)Nw+n) \quad (k = 1 \sim N) \qquad (29)$$

The orthogonal components of the N number of signals which have been obtained in this manner are each input into the multi-user detectors 1114-1 through 1114-N together with multi-user detection weights, which are output values from the multi-user detection weight calculator 1121, with NR number of signals used as input signals for each component. NT number of output signals b (m, k) are output respectively from each of the multi-user detectors 1114-1 through 1114-N as is shown by the following Formula (30).

[Formula 30]

$$b(m, k) = (b_1(m, k), \ldots, b_{NT}(m, k))^T \qquad (30)$$
$$= W^H(m, k) r(m, k)$$

Here, r (m, k) is the received signal vector and W (m, k) is the multi-user detection weight, and these are expressed respectively by the following Formulas (31) and (32).

[Formula 31]

$$r(m, k) = (f(k)[r_1(m), r_2(m), \ldots, r_{NR}(m)])^T \qquad (31)$$
$$= [R_1(m, k), R_2(m, k), \ldots, R_{NR}(m, k)]^T$$

[Formula 32]

(Weight 1) \hfill (32)

$$W(m, k) = \begin{bmatrix} w_{1,1}(m, k) & \cdots & w_{1,NT}(m, k) \\ \vdots & \ddots & \vdots \\ w_{NR,1}(m, k) & \cdots & w_{NR,NT}(m, k) \end{bmatrix}$$
$$= \left[\hat{H}(m, k) P \hat{H}^H(m, k) + \hat{C}(m, k) + \text{diag}(2\hat{\sigma}_1^2, \ldots, 2\hat{\sigma}_{Nr}^2)\right]^{-1} \hat{H}(m, k) P$$

(Weight 2)

$$W(m, k) = \begin{bmatrix} w_{1,1}(m, k) & \cdots & w_{1,NT}(m, k) \\ \vdots & \ddots & \vdots \\ w_{NR,1}(m, k) & \cdots & w_{NR,NT}(m, k) \end{bmatrix}$$
$$= \left[\hat{H}(m, k) P \hat{H}^H(m, k) + \hat{C}(m, k)\right]^{-1} \hat{H}(m, k) P$$

Here, hat (^) H (m, k) represents the NR×NT estimated channel matrix, and hat (^) C (m, k) is a matrix which represents the NR×NR estimated interference component contribution. Moreover, 2 (^)$\sigma^2_{nr}$ represents the estimated value of the noise variance in the $nr^{th}$ receiver antenna. The weight 1 is a solution derived using the minimum mean square error (MMSE) criterion, while the weight 2 is a weight when the noise variance (power) estimation is not required in weight 1. W (m, k) can also be used for the multi-user detection of the $n^{th}$ block as W (n, k) (wherein m≠n) when there is almost no channel time variation. Note that the multi-user detection weight calculator 1121 is described below in detail.

Next, after NT number of output signals have been obtained for each orthogonal component, the NT number of inverse orthogonal converters 1115-1 through 1115-NT perform inverse orthogonal conversion on N number of orthogonal components in each of the input transmission series, and then output NT number of time signal sequence as output signals. The rectangular filter circuits 1116-1 through 1116-NT receive the input of this NT number of signal sequence and, as is shown in FIG. 5, Mh number of signals in the front half portion and Mt number of signals in the rear half portion which are greatly affected by inter-block interference are removed from the N number of signals, and only Nw (=N−Mh−Mt) number of signals which are the signals remaining in the center which are minimally affected by interference are extracted and output as output signals. The parallel-to-serial converters 1117-1 through 1117-U perform parallel-to-serial conversion on these output signals, and output a time series for each transmission station (i.e., a U number thereof) as output signals.

Lastly, the demodulators 1118-1 through 1118-U demodulate the signals series which have been converted into the U number of series, and output the demodulated signal sequence. The deinterleaver circuits 1119-1 through 1119-U deinterleave the demodulated signal sequence and supply the results of this to the decoders 1120-1 through 1120-U. The decoders 1119-1 through 1119-U decode the deinterleaved results and output them as the decoding results.

By employing this type of structure, even when a broadband signal is being transmitted, by performing directional control on each of the orthogonal signal components, it is possible to identify the signals for each transmitting station using the timing offset between optional transmitting stations. Note that the above described processing can also be applied when guard intervals (GI) are present. Moreover, the above described processing can also be applied in the case of a single user MIMO (U=1).

Figure 7:
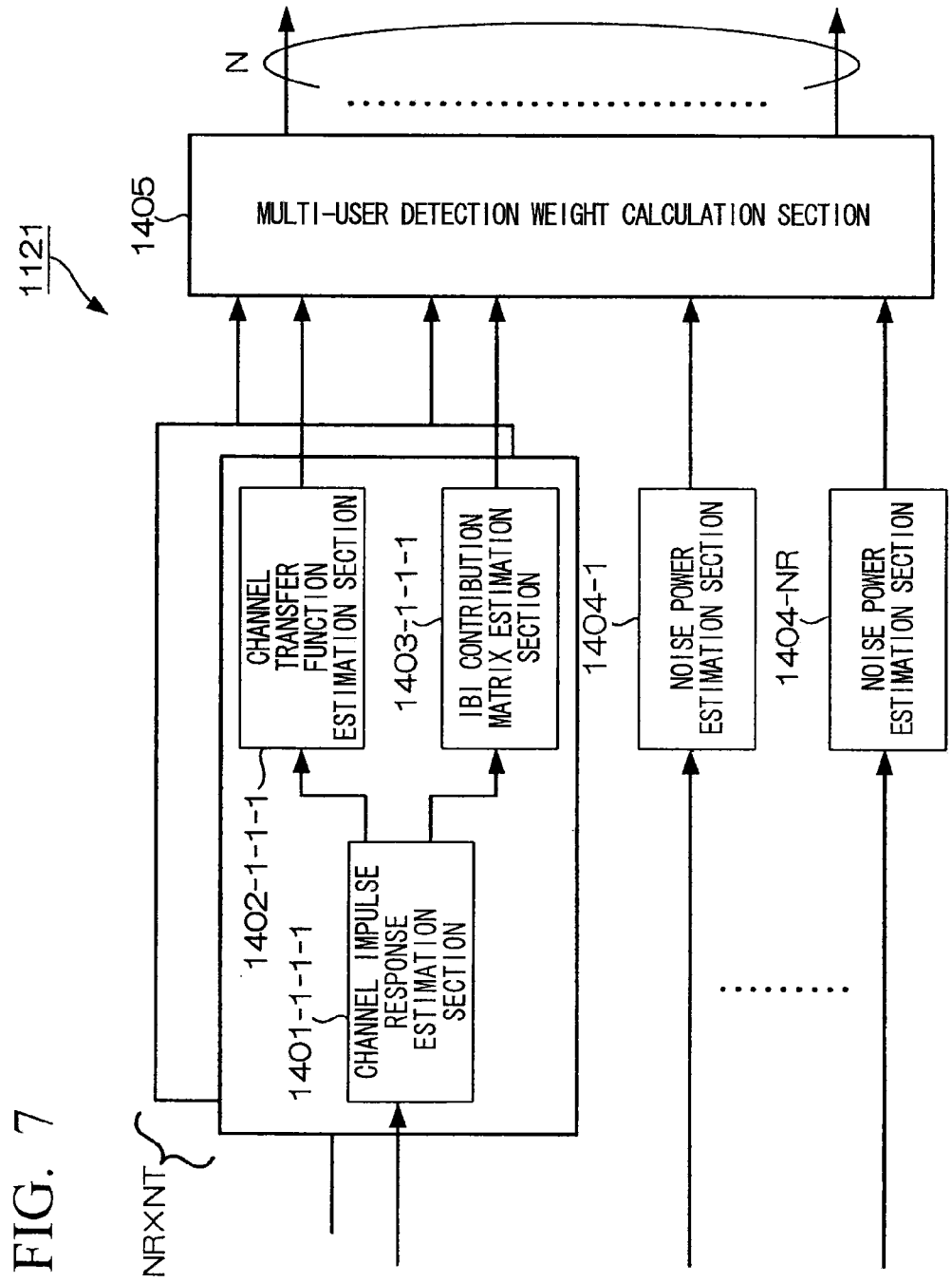
FIG. 7 is a block diagram showing a structural example of a multi-user detection weight calculator 1121 according to the first embodiment.

Next, FIG. 7 is a block diagram showing a structural example of the multi-user detection weight calculator 1121. In FIG. 7, 1401-1-1-1 through 1401-NR-U-nt (U) are channel impulse response estimation sections, 1402-1-1-1 through 1402-NR-U-nt (U) are channel transfer function estimation sections, 1403-1-1-1 through 1403-NR-U-nt (U) are IBI contribution matrix estimation sections, 1404-1 through 1404-NR are noise power estimation sections, and 1405 is a multi-user detection weight calculation section.

Taking a pilot received signal as an input signal, an estimated value for the propagation path impulse response which is transmitted from the $i^{th}$ antenna of the $u^{th}$ transmitting station and is received by the $nr^{th}$ receiver antenna of the receiving station is output as an output value from the channel impulse response estimation section 1401-$nr$-$u$-$i$ from among the channel impulse response estimation sections 1401-1-1-1 through 1401-NR-U-n (U) as is shown in Formula (33).

[Formula 33]

$$\hat{h}_{nr,u,i}(m) = (\hat{h}_{0,nr,u,i}(m), \ldots, \hat{h}_{L(u)-1,nr,u,i}(m), 0_{1 \times (N-L(u))})^T \quad (33)$$

The transfer function can be estimated by calculating a sliding correlation between the received signal and the pilot signal. It is also possible to estimate the transfer function by means of maximum likelihood estimation from the received signal and the pilot signal.

Moreover, by estimating the result of a convolution of the channel impulse response and the wavelength shaping filter, it is also possible to perform the multiplication of the bandwidth limiting filter on the receiving side at the same time as the multi-user detection is performed.

Thereafter, using channel impulse response values estimated respectively by the channel impulse response estimation sections 1401-1-1-1 through 1401-NR-U-nt (U) as input values, estimation values for the channel transfer functions (or for each component after orthogonal conversion) are calculated in the channel transfer function estimation sections 1402-1-1-1 through 1402-NR-U-nt (U), and the respective components after orthogonal conversion of the estimation values for the channels in the IBI components are calculated in the IBI contribution matrix estimation sections 1403-1-1-1 through 1403-NR-U-nt (U), and these are then output. The $k^{th}$ component hat (A) $H_{nr,u,i}(m,k)$ of the estimation values of the channel transfer function and the $k^{th}$ component hat (^) $C_{nr,u,i}(m,k)$ of the estimation values for the channels in the IBI components after orthogonal conversion are expressed respectively by the following Formula (34) and the following Formula (35).

[Formula 34]

$$\hat{H}_{nr,u,i}(m,k) = f(k)\hat{h}_{nr,u,i}(m) \quad (34)$$

[Formula 35]

$$\hat{C}_{nr,u,i}(m,k) = f(k)\hat{X}_{nr,u,i}(m)(f(k)\hat{X}_{nr,u,i}(m))^H + f(k)\hat{Y}_{nr,u,i}(m)(f(k)\hat{Y}_{nr,u,i}(m))^H \quad (35)$$

Here, hat (^) $X_{nr,u,i}(m)$ is expressed by the following Formula (36), and hat (^) $Y_{nr,u,i}(m)$ is expressed by the following Formula (37).

[Formula 36]

$$\hat{X}_{nr,u,i}(m) = \begin{bmatrix} \hat{h}_{L(u)-1,nr,u,i}(m) & \hat{h}_{L(u)-2,nr,u,i}(m) & \cdots & \hat{h}_{1,nr,u,i}(m) \\ 0 & \ddots & & \hat{h}_{2,nr,u,i}(m) \\ \vdots & & \ddots & \vdots \\ 0 & \cdots & 0 & \hat{h}_{L(u)-1,nr,u,i}(m) \\ & O_{Nd(u),L(u)-1} & & \end{bmatrix} \quad (36)$$

[Formula 37]

$$\hat{Y}_{nr,u,i}(m) = \begin{bmatrix} & O_{Nd(u),L(u)-1} & & \\ \hat{h}_{0,nr,u,i}(m) & 0 & \cdots & 0 \\ \hat{h}_{1,nr,u,i}(m) & \ddots & \ddots & \vdots \\ \vdots & & & 0 \\ \hat{h}_{L(u)-2,nr,u,i}(m) & \hat{h}_{L(u)-3,nr,u,i}(m) & \cdots & \hat{h}_{0,nr,u,i}(m) \end{bmatrix} \quad (37)$$

In contrast, taking the pilot received signal as an input signal, the noise power at each receiver antenna is estimated in the noise power estimation sections 1404-1 through 1404-NR, and the resulting estimated value is then output. The noise power can be estimated, for example, from the difference between the received signal power and the sum of the estimated power of the transfer functions. In this case, the powers of delay components whose transfer functions could not be estimated are added to the noise power. In addition to this, it is also possible to detect time segments where signals have not been received by the respective receiver antennas, and to measure the noise power from the received power measured in these segments.

The multi-user detection weight calculation section 1405 uses the above described estimated values for the channel transfer functions (or for each component after orthogonal conversion) output from the channel transfer function estimation sections 1402-1-1-1 through 1402-NR-U-nt (U), and also the estimated values hat (A) C (m, k) of the respective orthogonal components of the IBI output from the IBI contribution matrix estimation sections 1403-1-1-1 through 1403-NR-U-nt (U), and the estimated values 2 hat (^)$\sigma^2_{nr}$ (nr=1~NR) of the noise power output from the noise power estimation sections 1404-1 through 1404-NR as input values, calculates multi-user detection weights, and outputs the result of these calculations.

Here, in the above described multi-user detection weight calculation section 1405, a method is used in which pilot signals are transmitted by the transmitting side and estimations are made based on these, however, it is also possible to use received signals from the data section as input signals, and to consider signals obtained through decision feedback as the transmitted pilot signals, and thereby estimate the multi-user detection weight. Moreover, the above described channel signal response estimation is performed using time series as input signals, however, it is also possible for this estimation to be performed using post-orthogonal conversion received signals as input signals.

The above described system estimates noise power using the noise power estimation sections 1404-1 through 1404-NR, however, if weight 2 is used, this section is not required.

Encoding Interleaver

Figure 8:
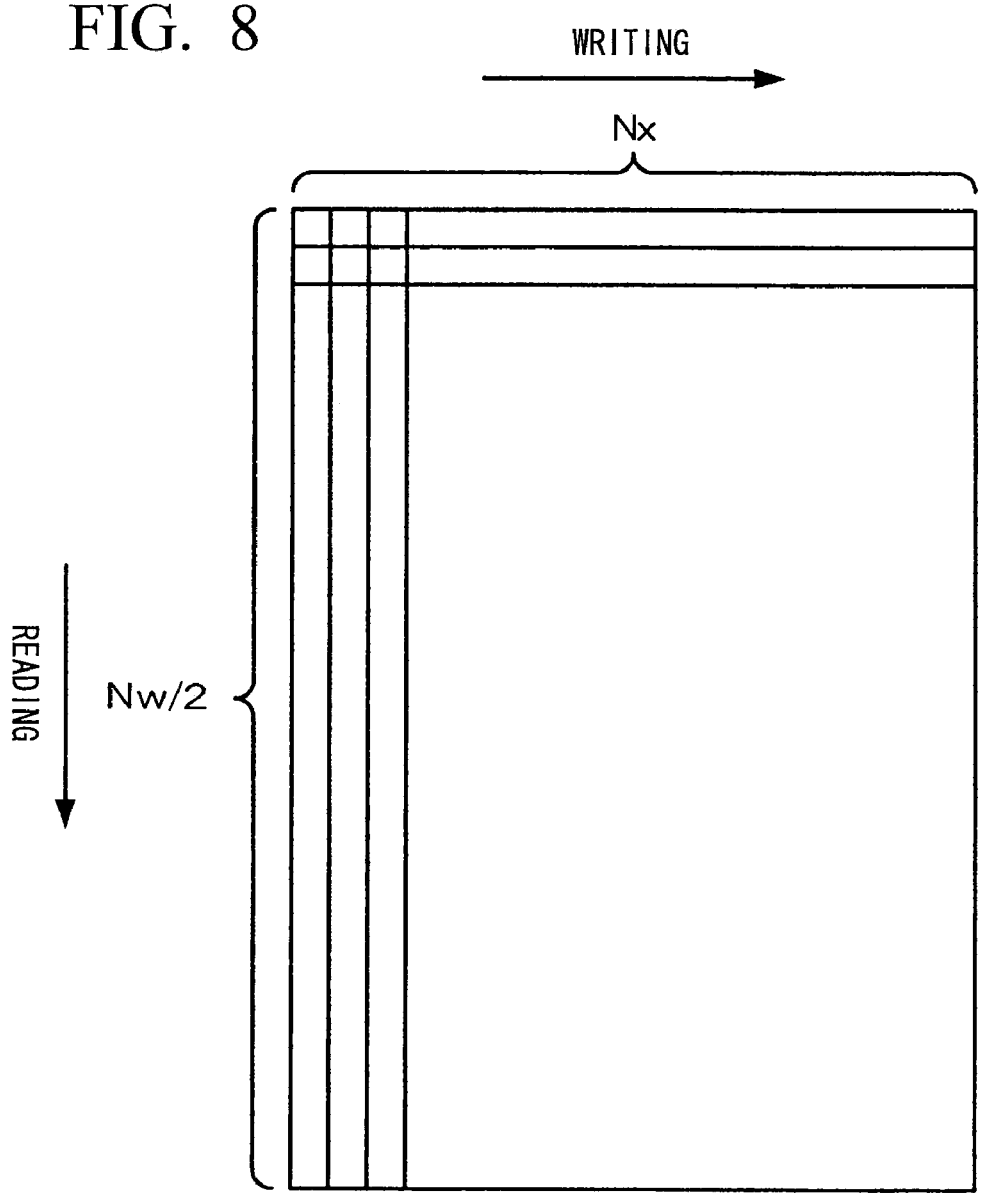
FIG. 8 is a conceptual view in order to illustrate a block interleaver according to the first embodiment.

FIG. 8 is a conceptual view used to illustrate a block interleaver.

When using the present invention, because the effect of the IBI is greater on signals closer to the ends, the respective output signals from the rectangular filters 1116-1 through 1116-NT are more reliable (i.e., have a smaller error rate) the closer they are to the center of the signals, and the reliability decreases (i.e., the error rate is larger) moving towards the ends. Because of this, in a transmitting station (see FIG. 5), a symbol interleaver circuit is provided which, using the Nw/2× Nx block interleavers shown in FIG. 8, reads input values vertically for the serial-to-parallel conversion nt (u) series which has been converted by the serial-to-parallel conversion circuit 1103-$u$, and outputs horizontally written results.

In the receiving station (see FIG. 6), a symbol deinterleaver circuit is provided which, using the Nw/2×Nx block deinterleavers, reads input values horizontally for the respective signal sequence which have undergone rectangular filtering in the rectangular filter circuits 1116-1 through 1116-NT and have been output, and outputs vertically written results. Note that Nx is an optional positive number.

Using a block interleaver and block deinterleaver having a vertical length of Nw/2 such as that shown in FIG. 8, signals having a high level of reliability and signals having a low level of reliability are lined up alternatingly in the signal sequence. As a result, because errors are changed from burst errors to random errors, it is possible to increase the effectiveness of error correction encoding.

Moreover, it is also possible to use a random interleaver as the symbol interleaver instead of a block interleaver.

Successive Interference Cancel Device

In the receiving station, instead of performing multi-user detection, it is also possible to separate signals using a successive interference cancel device.

Figure 9:
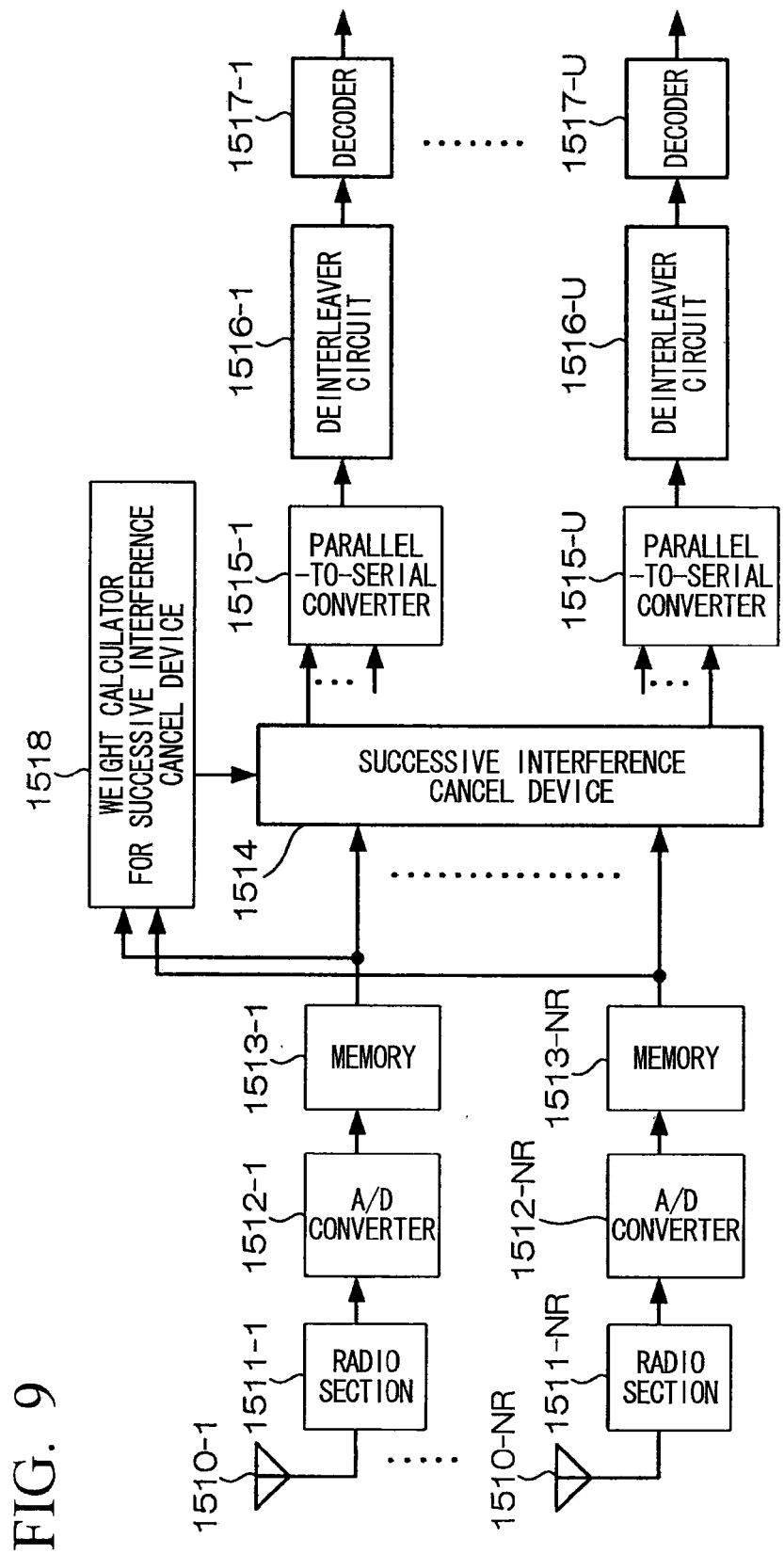
FIG. 9 is a block diagram showing the structure of a receiver when a successive interference cancel device is used in the first embodiment.

FIG. 9 is a block diagram showing the structure of a receiver when a successive interference cancel device is used. In FIG. 9, 1510-1 through 1510-NR are receiver antennas, 1511-1 through 1511-NR are radio sections, 1512-1 through 1512-NR are A/D converters, 1513-1 through 1513-NR are memories, 1514 is a successive interference cancel device, 1515-1 through 1515-U are parallel-to-serial converters, 1516-1 through 1516-U are deinterleaver circuits, and 1517-1 through 1517-U are decoders. 1518 is a weight calculator for the successive interference cancel device.

Signals received by the receiver antennas 1510-1 through 1510-NR are supplied to the radio sections 1511-1 through 1511-NR for each receiver antenna. The radio sections 1511-1 through 1511-NR then perform frequency conversion respectively for each receiver antenna, and output baseband signals. Using these baseband signals as input signals, the A/D converters 1512-1 through 1512-NR convert the analog signals into digital signals. Signal sequence which have been converted into these digital signals are then stored in the memory 1513-1 through 1513-NR.

Thereafter, N number of signals are read and are input into the successive interference cancel device 1514 together with equalization weights which are output values from the weight calculator 1518 for the successive interference cancel device, while the signal sequence stored in the memory are being shifted each time by Nw number of signals. The successive interference cancel device 1514 is described below in detail. The NT number of signal sequence which are output from the successive interference cancel device 1514 are supplied to the parallel-to-serial converters 1515-1 through 1515-U. Signal sequence are then output for each (i.e., for U number of) transmitting station from the parallel-to-serial converters 1515-1 through 1515-U. Finally, using the signal sequence which have been converted into U number of series as input signals, the deinterleaver circuits 1516-1 through 1516-U output deinterleaved signal sequence. These signal sequence are then decoded by the decoders 1517-1 through 1517-U and the decoding results are output.

Figure 10:
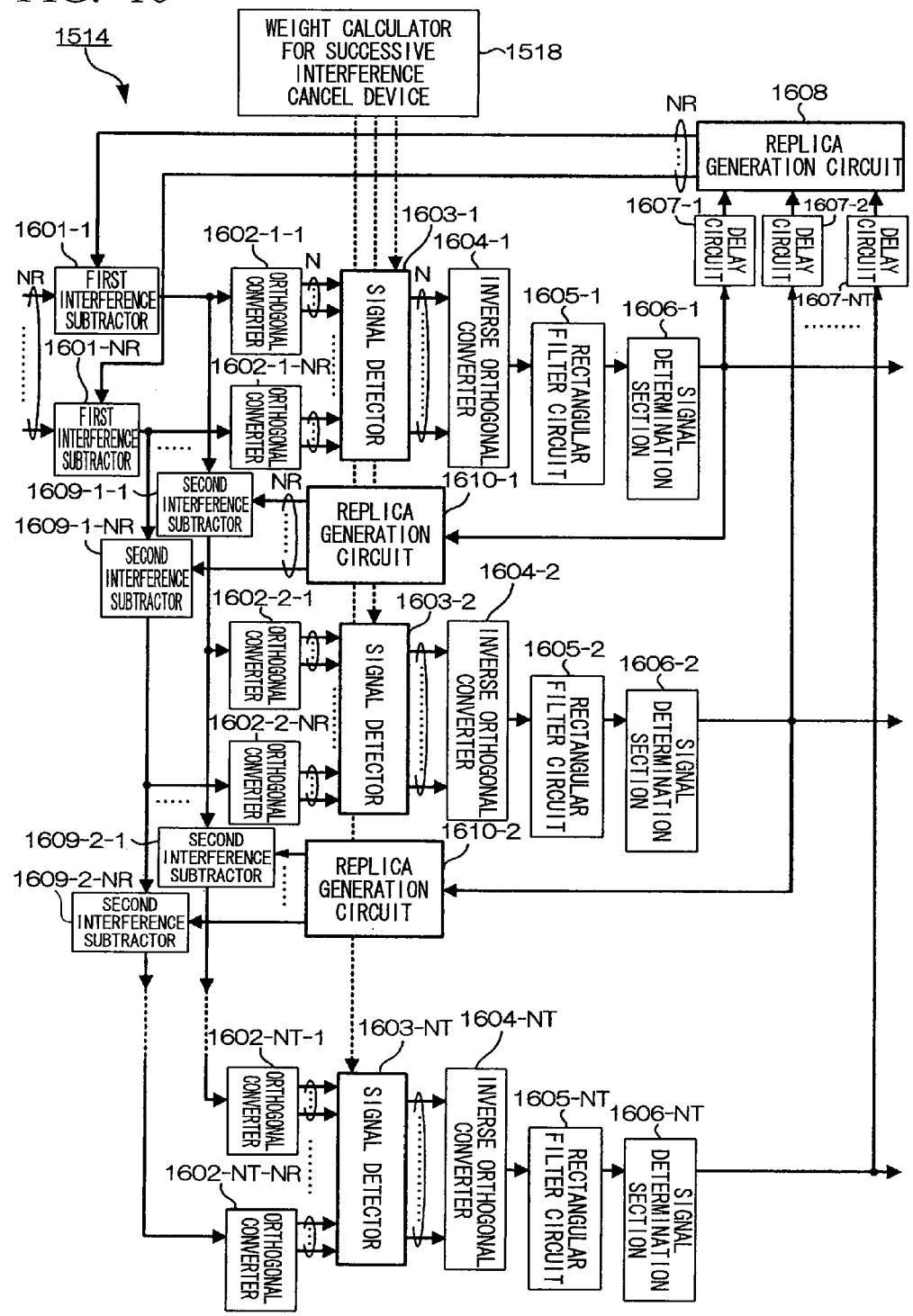
FIG. 10 is a block diagram showing the structure of a successive interference cancel device 1514 according to the first embodiment.

Next, FIG. 10 is a block diagram showing the structure of the successive interference cancel device 1514. In FIG. 10, 1601-1 through 1601-NR are first interference subtractors, 1602-1-1 through 1602-NT-NR are orthogonal converters, 1603-1 through 1603-NT are signal detectors, 1604-1 through 1604-NT are inverse orthogonal converters, 1605-1 through 1605-NT are rectangular filter circuits, 1606-1 through 1606-NT are signal determination sections, 1607-1 through 1607-NT are delay circuits, 1608 is a replica generation circuit, 1609-1-1 through 1609-(NT−1)-NR are second interference subtractors, and 1610-1 to 1610-(NT−1) are replica generation circuits.

When the successive interference cancel device 1514 is operated, sequence allocation is essential. Here, the estimation values for each antenna channel are used for the sequence allocation, and all normal allocating methods which are used in successive interference cancel devices may be applied, such as instantaneous received power (i.e., the signal-to-noise power ratio), or such as the mean transmission quality (for example, the signal-to-interference plus noise power ratio SINK, or the bit error rate performance or the like) for each transmitted signal sequence, or such as a transmitted signal sequence arranged in order of highest priority.

In the description given below, in the received signal of the $m^{th}$ block, demodulation is performed in sequence from the first stream of the first transmitting station, and when the demodulation of the $i^{th}$ stream of the $u^{th}$ transmitting station is being performed, the $i-1^{th}$ demodulation results for the $u^{th}$ transmitting station (when i=1, then the nt $(u-1)^{th}$ demodulation results for the $u-1^{th}$ transmitting station) are used.

In the replica generation circuit 1608, a received signal sequence (i.e., time series) formed by the post determination NT series before the $m-1^{th}$ block is used as an input signal, and using the estimated channel impulse response, a replica of the interference component (shown in the following Formula (38)) in the receiver antenna nr from the block immediately prior thereto is created, and the result of this (i.e., a time series signal) is output.

[Formula 38]

$$\sum_{u=1}^{U} \sum_{i=1}^{nt(u)} \hat{X}_{nr,u,i}(m)\hat{u}_{u,i}(m) \ (nr = 1 \sim NR) \tag{38}$$

In the first interference subtractors 1601-1 through 1601-NR, taking a received signal (time series) vector $r_{nr}(m)$ and the replica of the interference component shown in Formula (38) given above from the block immediately prior thereto which was created by the replica generation circuit 1608 as inputs, the interference component is subtracted from the received signal and the result shown in the following Formula (39) is output.

[Formula 39]

$$z(m) = r_{nr}(m) - \sum_{u=1}^{U} \sum_{i=1}^{nt(u)} \hat{X}_{nr,u,i}(m)\hat{u}_{u,i}(m) \tag{39}$$

Taking received signals from which the interference components have been removed and which are formed in blocks which are formed respectively by N number of time series signals as inputs, the orthogonal converters 1602-1-1 through 1602-NT-NR perform orthogonal conversion, and output N number of orthogonal components. Here, the $k^{th}$ orthogonal component hat ($\hat{\ }$) $r'_{i-1}$ (m, k) of the signals output from the orthogonal converters 1602-$i'$-1 through 1602-$i'$-NR (wherein i' is expressed by Formula (17) given above) is the $k^{th}$ orthogonal component after orthogonal conversion has been performed on the received signals from which the interference signals have been subtracted as far as the $i'-1^{th}$ stream, and is expressed by the following Formula (40) and Formula (41).

[Formula 40]

$$\hat{r}_{i'-1}(m,k) = (\hat{r}_{i'-1,1}(m,k), \ldots, \hat{r}_{i'-1,NR}(m,k))^T \tag{40}$$

[Formula 41]

$$\hat{r}_{i'-1,nr}(m,k) = \tag{41}$$
$$f(k)\left\{ r_{nr}(m) - \sum_{u'=1}^{u-1} \sum_{p=1}^{nt(u')} \hat{H}_{nr,u',p}(m)\hat{s}_{u',p}(m) - \sum_{p=1}^{i-1} \hat{H}_{nr,u,p}(m)\hat{s}_{u,p}(m) - \sum_{u=1}^{U} \sum_{p=1}^{nt(u)} \hat{X}_{nr,u,p}(m)\hat{u}_{u,p}(m) \right\}$$

Here, hat ($\hat{\ }$)$H_{nr,u,p}$ (m) is an estimated value for the tilde ($\sim$) $H_{nr,u,p}$ (m), and hat ($\hat{\ }$)$S_{u,p}$ (m) is a replica of the vector $s_{u,p}$ (m).

Taking the output signals from the orthogonal converters 1602-1-1 through 1602-NT-NR, and also weights which take into consideration the residual inter-block interference calculated by the weight calculator for the successive interference cancel device 1518 as input values, the signal detectors 1603-1 through 1603-NT perform signal detection, and output the N number of results.

Here, the $k^{th}$ (=1~N) orthogonal component of the output from the signal converter 1603-$i'$ is expressed by the following Formula (42).

[Formula 42]

$$b_{i'}(m,k) = w_{i'}^H(m,k)\hat{r}_{i'-1}(m,k) \tag{42}$$

Here, the vector $w_{i'}(m, k)$ is a multi-user detection weight for the successive interference cancel device which is created by the weight calculator for the successive interference cancel device 1518, and is set to a value which reduces to a minimum any discrepancy between the received signal and the transmitted signal after the interference has been removed, and is provided by the following Formula (43).

[Formula 43]

$$w_{i'}(m,k) = \arg\min_{w_{i'}(m,k)} E[\|f(k)s_{u,i}(m) - b_{i'}(m,k)\|^2] \tag{43}$$

In the same way as the MMSE weight of the above described multi-user detection is derived, the weight of the above Formula (43) can also undergo formula development. $W_i'$ (m, k) can also be used for the $n^{th}$ block as (n, k) (wherein m≠n) when there is almost no channel time variation.

The inverse orthogonal converters 1604-1 through 1604-NT then perform inverse orthogonal conversion on the N number of signals after signal detection, and output N number of time series signals. In the rectangular filter circuits 1605-1 through 1605-NT, Mh number of signals in the front half portion and Mt number of signals in the rear half portion which are greatly affected by inter-block interference are removed from the N number of series signals after the inverse orthogonal conversion, and only Nw (=N−Mh−Mt) number of signals which are the signals remaining in the center which are minimally affected by interference are extracted and output. In the signal determination sections 1606-1 through 1606-NT, soft decision or hard decision processing is performed on each of the Nw number of time series signals, and Nw number of determination results are output. In the delay circuits 1607-1 through 1607-NT, a delay of one block portion is applied to the Nw number of signals which have undergone soft decision or hard decision processing, and these are then output to the replica generation circuit 1608.

Next, taking the received signals (i.e., time series) z (m) formed by NR series from which the interference has been removed, and the replica of the interference component from the block immediately prior which was created by the replica generation circuits 1610-1 through 1610-(NT−1) as input signals, the second interference subtractors 1609-1-1 through 1609-(NT−1)-NR subtract newly created interference components from the received signals from which the interference has been removed, and output the results.

Here, output signals from the interference subtractor 1609-($i'$−1)-nr are expressed by the following Formula (44).

[Formula 44]

$$r_{nr}(m) - \sum_{u'=1}^{u-1} \sum_{p=1}^{nt(u')} \hat{H}_{nr,u',p}(m)\hat{s}_{u',p}(m) - \tag{44}$$
$$\sum_{p=1}^{i-1} \hat{H}_{nr,u,p}(m)\hat{s}_{u,p}(m) - \sum_{u=1}^{U} \sum_{p=1}^{nt(u)} \hat{X}_{nr,u,p}(m)\hat{u}_{u,p}(m)$$

A replica (i.e., time series formed by NR) of the inter-user interference component in the $m^{th}$ block is output from the replica generation circuits 1610-1 through 1610-(NT−1) using an estimated channel impulse response for the Nw number of signals determined in the signal determination sections 1606-1 through 1606-NT. Here, a replica of the inter-user interference output from the replica generation circuit 1610-($i'$−1) is expressed by the following Formula (45).

[Formula 45]

$$\hat{H}_{nr,u,i-1}(m)\hat{s}_{u,i-1}(m) \tag{45}$$

The orthogonal converters 1602-1-1 through 1602-NT-NR may also be provided at a stage in front of the first interference subtractors 1601-1 through 1601-NR. In this case, although NR×NT number of orthogonal converters was previously required, the number thereof can be decreased to NR. In addition, in this case, interference replicas output from the replica generation circuit 1608 and the replica generation circuits 1610-1 through 1610-(NT−1) must be converted into orthogonal components. Accordingly, the first interference subtractors 1601-1 through 1601-NR and the second interference subtractors 1609-1-1 through 1609-(NT−1)-NR remove the interference for each orthogonal component.

Signals for either soft decision values or hard decision values are output from the signal determination processing sections 1601-1 through 1601-NT. Moreover, it is also possible to input them first into an error correction decoder and then perform soft decision processing or hard decision processing on the output results thereof. Bandwidth limiting filtering which is performed on the signals on the receiving side, can be performed anywhere between the radio sections 1511-1 through 1511-NR and the successive interference cancel device 1514, or by the signal detectors 1603-1 through NT.

The successive interference cancel device 1514 operates in a closed single block unit, however, it is also possible to perform successive interference cancel across a plurality of blocks. As an example thereof, a case is described below in detail in which there are four users, and each user has one transmitter antenna, and demodulation is performed in the sequence User 1→User 2→User 3→User 4.

Here, FIG. 11 is a conceptual view showing an example of a demodulation process performed by the successive interference cancel device 1514. By demodulating each block in the sequence shown in FIG. 11, for example, when the $(m+1)^{th}$ block of User 3 is being demodulated, because demodulation has been performed for User 1 as far as the $(m+3)^{th}$ block and for User 2 as far as the $(m+2)^{th}$ block, it is possible to create replicas of all the signal components for User 1 and User 2 in the $(m+1)^{th}$ block. Accordingly, if no demodulation errors have occurred, because it is possible to completely remove interference signals from User 1 and User 2 and demodulate the signals of User 3, there is an improvement in performance.

To put this more simply, if the demodulation of the $m^{th}$ block of a signal transmitted from the $i^{th}$ antenna of the $u^{th}$ user is considered, then it is possible for the transmitted signal transmitted from the $i-1^{th}$ antenna of the $u^{th}$ user to be demodulated at least as far as the $(m+1)^{th}$ block. As a result of this, the demodulation of the $m^{th}$ block of a signal transmitted from the $i^{th}$ antenna of the $u^{th}$ user is performed from the received signal shown in the following Formula (46) from which interference has been removed as far as the $i-1^{th}$ antenna of the $u^{th}$ user. This means that the IBI component shown by the following Formula (47) is also removed from the $(m+1)^{th}$ block as far as the antenna of the $u^{th}$ user.

[Formula 46]

$$\hat{r}_{i'-1,nr}(m) = r_{nr}(m) - \sum_{u'=1}^{u-1}\sum_{p=1}^{nt(u')} \hat{H}_{nr,u',p}(m)\hat{s}_{u',p}(m) - \sum_{p=1}^{i-1}\hat{H}_{nr,u,p}(m)\hat{s}_{u,p}(m) - \sum_{u=1}^{u-1}\sum_{p=1}^{nt(u)}\hat{X}_{nr,u,p}(m)\hat{u}_{u,p}(m) - \sum_{u'=1}^{u-1}\sum_{p=1}^{nt(u')}\hat{Y}_{nr,u',p}(m)\hat{v}_{u',p}(m) - \sum_{p=1}^{i-1}\hat{Y}_{nr,u,p}(m)\hat{v}_{u,p}(m) \quad (46)$$

[Formula 47]

$$\sum_{u'=1}^{u-1}\sum_{p=1}^{nt(u')}Y_{nr,u',p}(m)v_{u',p}(m) + \sum_{p=1}^{i-1}Y_{nr,u,p}(m)v_{u,p}(m) \quad (47)$$

Because of this, although it was not possible in the above-described successive interference cancel device 1514 to remove interference from the $(m+1)^{th}$ block, by operating across a plurality of blocks in this manner, it is possible to reduce interference even further, and it is possible to improve the decoding performance for signals transmitted from the $i^{th}$ antenna of the $u^{th}$ user.

The above operation is an illustration of the successive interference cancel device 1514, however, in the same way as in the related art, this operation can also be performed by a parallel interference removal device. It is also possible for a variety of options to be used for the successive interference cancel device 1514.

Second Embodiment

When Multicarrier Transmission is Used

Structure of the Second Embodiment

Next, an embodiment of the present invention in which multicarrier transmission is used will be described.

Figure 12:
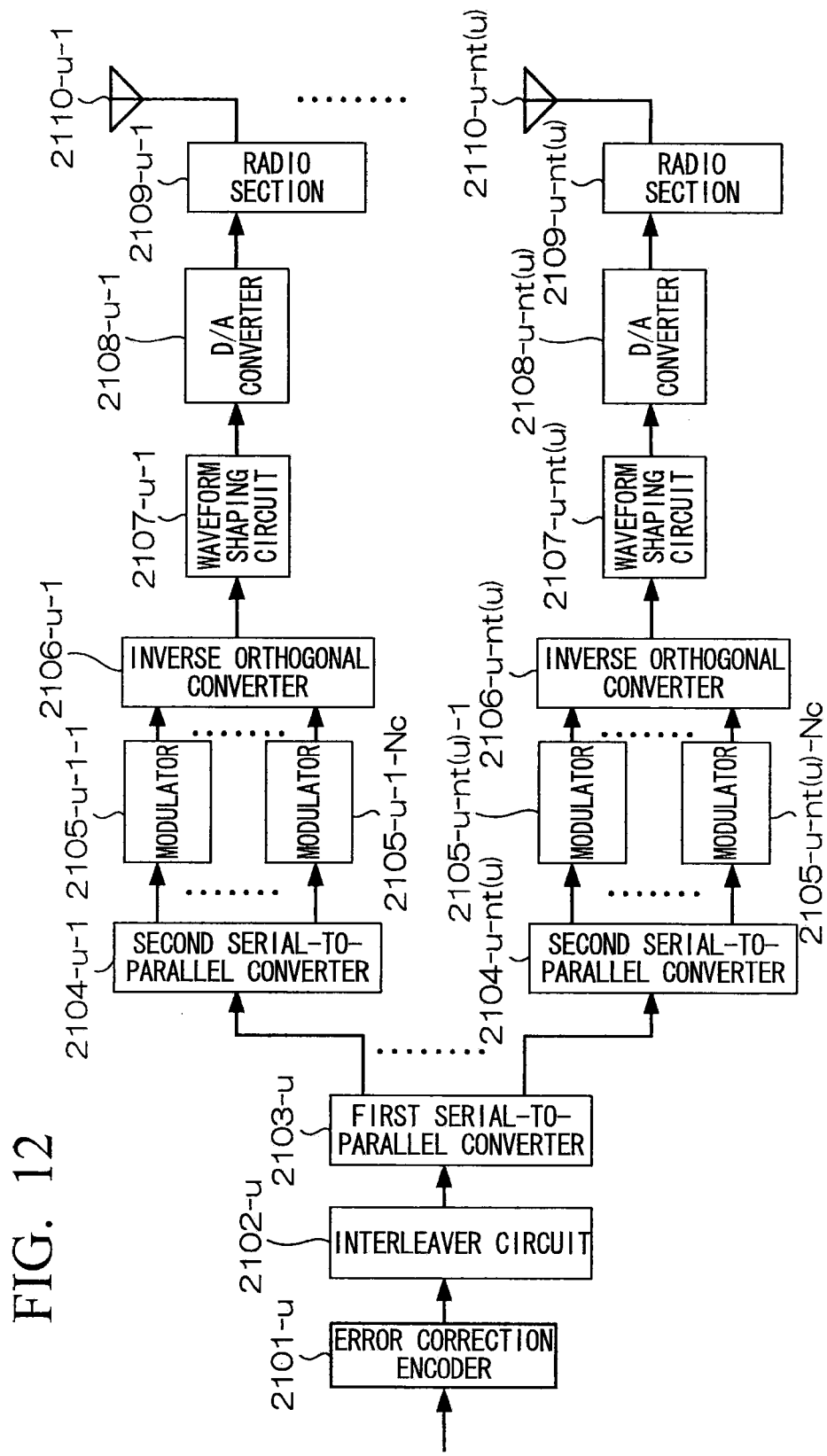
FIG. 12 is a block diagram showing the structure of a transmission system in a $u^{th}$ transmitting station according to a second embodiment.

FIG. 12 is a block diagram showing the structure of a transmission system in the $u^{th}$ transmitting station according to the present embodiment. In FIG. 12, 2101-$u$ is an error correction encoder of the $u^{th}$ transmitting station, 2102-$u$ is an interleaver circuit of the $u^{th}$ transmitting station, 2103-$u$ is a first serial-to-parallel converter of the $u^{th}$ transmitting station, 2104-$u$-1 through 2104-$u$-$nt$ (u) are second serial-to-parallel converters of the $u^{th}$ transmitting station, 2105-$u$-1-1 through 2105-$u$-$nt$ (u)-Nc are modulators of the $u^{th}$ transmitting station, 2106-$u$-1 through 2106-$u$-$nt$ (u) are inverse orthogonal converters, 2107-$u$-1 through 2107-$u$-$nt$ (u) are waveform shaping circuits, 2108-$u$-1 through 2108-$u$-$nt$ (u) are D/A converters of the $u^{th}$ transmitting station, 2109-$u$-1 through 2109-$u$-$nt$ (u) are radio sections of the $u^{th}$ transmitting station, and 2110-$u$-1 through 2110-$u$-$nt$ (u) are transmitter antennas. Note that the first serial-to-parallel converter 2103-$u$ and the second serial-to-parallel converters 2104-$u$-1 through 2104-$u$-$nt$ (u) may also be grouped together in a single serial-to-parallel converter.

Figure 13:
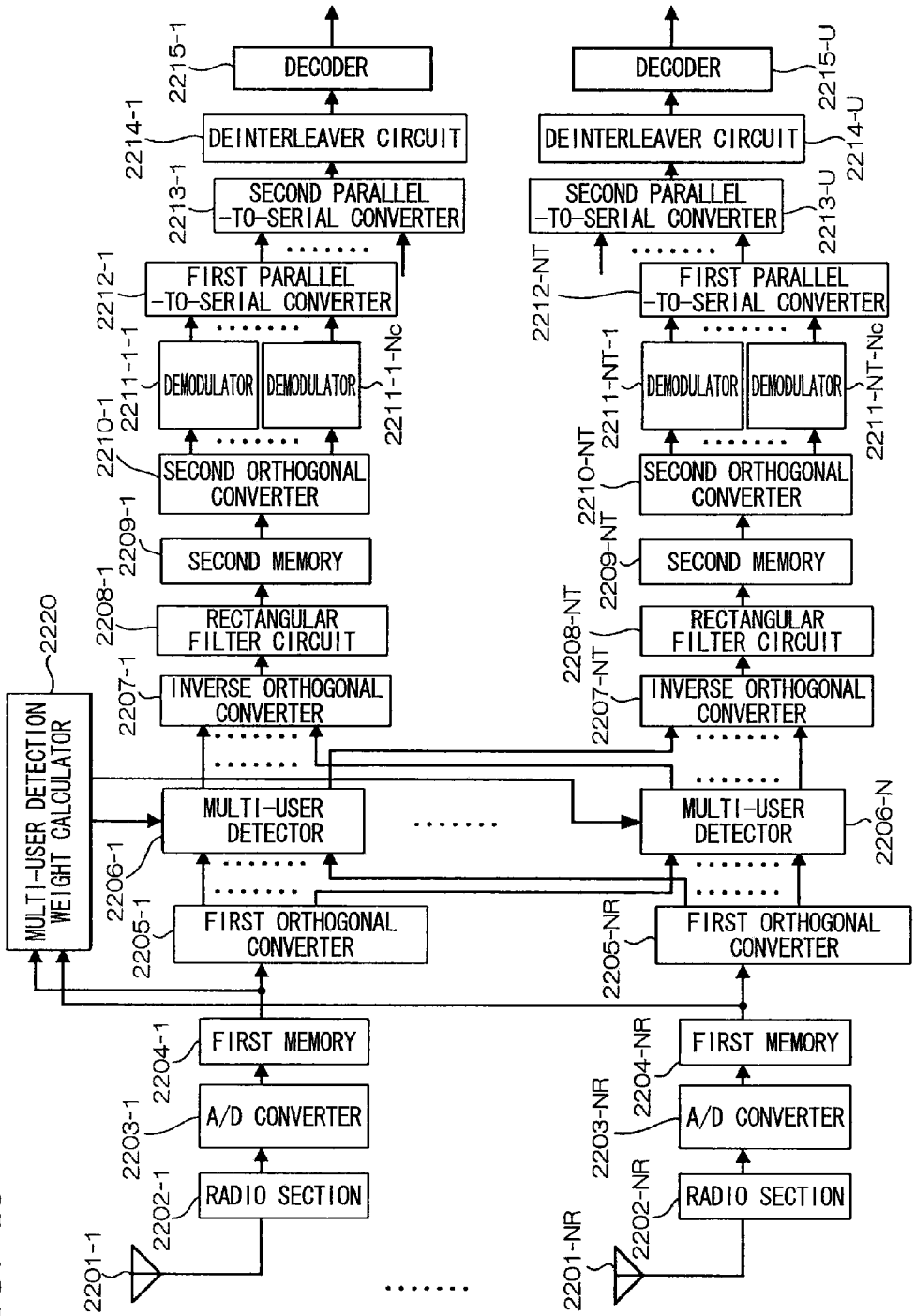
FIG. 13 is a block diagram showing the structure of a reception system according to the second embodiment.

Moreover, FIG. 13 is a block diagram showing the structure of a receiving system according to the present embodiment. In FIG. 13, 2201-1 through 2201-NR are receiver antennas, 2202-1 through 2202-NR are radio sections, 2203-1 through 2203-NR are A/D converters, 2204-1 through 2204-NR are first memories, 2205-1 through 2205-NR are first orthogonal converters, 2206-1 through 2206-N are multi-user detectors, 2207-1 through 2207-NT are inverse orthogonal converters, 2208-1 through 2208-NT are rectangular filter circuits, 2209-1 through 2209-NT are second memories, 2210-1 through 2210-NT are second orthogonal converters, 2211-1-1 through 2211-NT-Nc are demodulators, 2212-1 through 2212-NT are first parallel-to-serial converters, 2213-1 through 2213-U are second parallel-to-serial converters, 2214-1 through 2214-U are deinterleaver circuits, and 2215-1 through 2215-U are decoders. In addition, 2220 is a multi-user detection weight calculator.

Note that the first parallel-to-serial converters 2212-1 through 2212-NT and the second parallel-to-serial converters 2213-1 through 2213-U may also be grouped together into U number of parallel-to-serial converters. Moreover, by moving the first parallel-to-serial converters 2212-1 through 2212-NT and the second parallel-to-serial converters 2213-1 through 2213-U to between the rectangular filter circuits 2208-1 through 2208-NT and the memory 2209-1 through 2209-NT, it is possible to reduce the subsequent second orthogonal converters 2210-1 through 2210-NT to a number U thereof, and to reduce the demodulators 2211-1-1 through 2211-NT-Nc to a number U×Nc thereof.

Moreover, in the present invention it is assumed that signals are transmitted on all of the Nc number of subcarriers, however, as in a multicarrier transmission of the related art, it is not necessary for signals to be carried on all of the subcarriers, and it is also possible for signals to only be carried on desired subcarriers.

Moreover, in the description given below, oversampling has not been assumed, however, it is also possible to perform oversampling in the A/D converters 2203-1 through 2203-NR. In this case, downsampling is performed anywhere between the memory 2204-1 through 2204-NR and the rectangular filter circuits 2208-1 through 2208-NT. If downsampling is performed somewhere between the first memory 2204-1 through 2204-NR and the first orthogonal converters 2205-1 through 2205-NR, then it is possible to reduce the scale of calculation of the signal processing on the receiving side. Moreover, if downsampling is performed somewhere between the multi-user detectors 2206-1 through 2206-N and the rectangular filter circuits 2208-1 through 2208-NT, then it is also possible to increase the desired signal power.

Furthermore, in the receiving station, the arrival timings for each transmitting station are estimated by means of a commonly used method. For example, predetermined timing detection training signals are inserted within the transmitted signals from each transmitting station, while in the receiving station, by correlating the received signals with the training signals, it is possible to estimate the arrival timings of each transmitting station.

It is also possible to allocate in advance a different timing detection training signal to each transmitting station. In addition to this, for each transmitting station it is possible to select at random a timing detection training signal from among a plurality of predetermined timing detection training signals, and then transmit this to that transmitting station.

In the receiving stations, a method may be employed in which a correlation with timing detection training signals is established only for signals received by antennas having the highest received signal levels, or alternatively, a method may be employed in which a correlation with the timing detection training signals is established for each signal received by the respective antennas, and these are then synthesized. By employing one of these methods, it is possible to detect transmission timings. This transmission timing detection may be achieved by means of a method which is performed for each frame, a method which is performed before communication starts, or a method which uses a timing estimated in the previous frame. Hereinafter, a detailed description is given of the operations in each communication frame with it being assumed that reception timings from each transmitting station have been estimated prior to the communication frame making the signal transmission.

Firstly, the transmitting side will be described. Here, the signal processing performed by the $u^{th}$ transmitting station will be described. Taking a binary data sequence transmitted by the $u^{th}$ transmitting station as an input signal, this input signal is supplied to the error correction encoder 2101-*u*. An encoded binary data sequence is output from the error correction encoder 2101-*u*. The output from the error correction encoder 2101-*u* is input into the interleaver circuit 2102-*u*, and an interleaved data sequence is then output. Thereafter, the first serial-to-parallel converter 2103-*u* performs serial-to-parallel conversion on the interleaved data sequence, so as to convert them into nt (u) number of series and these are then output.

Furthermore, the signals are then split between Nc number of subcarriers by the second serial-to-parallel converters 2104-*u*-1 through 2104-*u*-*nt* (u). Taking the split signal sequence as inputs, the modulators 2105-*u*-1-1 through 2105-*u*-*nt* (u)-Nc perform symbol modulation, and output the result as a symbol sequence. The result of this output is then input into the inverse orthogonal converters 2106-*u*-1 through 2106-*u*-*nt* (u), and multicarrier time signals are output therefrom. These output signals are then transmitted as RF signals from the antennas 2110-*u*-1 through 2110-*u*-*nt* (u) via the waveform shaping circuits 2107-*u*-1 through 2107-*u*-*nt* (u), the D/A converters 2108-*u*-1 through 2108-*u*-*nt* (u), and the radio sections 2109-*u*-1 through 2109-*u*-*nt* (u) for each antenna. The signal processing described above is performed in the same manner in all of the transmitting stations.

Next, the signal processing on the receiving side will be described. Signals received by the receiver antennas 2201-1 through 2201-NR are supplied to the radio sections 2202-1 through 2202-NR for each receiver antenna with the signal sequence thereof used as the input signals. Frequency conversion is then performed in the radio sections 2202-1 through 2202-NR, and baseband signals are output. These baseband signals are input into the A/D converters 2203-1 through 2203-NR. Analog/digital conversion is conducted in the A/D converters 2203-1 through 2203-NR and the digital signals that are thereby obtained are stored in the first memory 2204-1 through 2204-NR.

Thereafter, as is shown in FIG. 3, N number of signals of the signal sequence which are stored in the first memory 2204-1 through 2204-NR are read and supplied to the first orthogonal converters 2205-1 through 2205-NR with the lead position thereof shifted each time by Nw number of signals. In the $nr^{th}$ (wherein nr=1~NR) first orthogonal converter 2205-*nr*, when the input signals (i.e., time series) which are input into the $m^{th}$ (wherein m is the block number) first orthogonal converter 2205-*m* are taken as $r_{nr}((m-1)Nw+1)$ ~$r_{nr}((m-1)Nw+N)$, the output values (i.e., orthogonal components) are expressed by Formula (29) described in the first embodiment using N number of orthogonal signals e (k, n) having a length of N which are set in advance.

The orthogonal components of the N number of signals which have been obtained in this manner are each input into the multi-user detectors 2206-1 through 2206-N together with multi-user detection weights, which are output values from the multi-user detection weight calculator 2220, with NR number of signals used as input signals for each component. NT number of output signals b (m, k) are output respectively from each of the multi-user detectors 2206-1 through 2206-N as is shown by Formula (30) of the first embodiment.

Here, r (m, k) is the received signal vector and W (m, k) is the multi-user detection weight, and these are expressed respectively by Formulas (31) and (32) of the first embodiment.

Here, hat (^) H (m, k) represents the NR×NT estimated channel matrix, and hat (^) C (m, k) is a matrix which represents the NR x NR estimated interference component contribution. Moreover, 2 (^)$\sigma^2_{nr}$ represents the estimated value of the noise variance in the $nr^{th}$ receiver antenna. The weight 1 is a solution derived using the minimum mean square error (MMSE) criterion, while the weight 2 is a weight when the noise variance (power) estimation is not required in weight 1. W (m, k) can also be used for the multi-user detection of the $n^{th}$ block as W (n, k) (wherein m≠n) when there is almost no channel time variation. Note that the multi-user detection weight calculator 2220 is described below in detail.

Next, after NT number of output signals have been obtained for each orthogonal component, the NT number of inverse orthogonal converters 2207-1 through 2207-NT perform inverse orthogonal conversion on N number of orthogonal components in each of the input transmission series, and then output NT number of time signal sequence as output signals. The rectangular filter circuits 2208-1 through 2208-NT receive the input of this NT number of signal sequence and, as is shown in FIG. 3, Mh number of signals in the front half portion and Mt number of signals in the rear half portion which are greatly affected by interblock interference are removed from the N number of signals, and only Nw (=N−Mh−Mt) number of signals which are the signals remaining in the center which are minimally affected by interference are extracted and output as output signals. The second memory 2209-1 through 2209-U receive the input of these output signals and store received signal sequence.

Each time the stored signal sequence for one multicarrier symbol portion have been accumulated, a multicarrier symbol formed by Nc number of transmission symbols are output, and are supplied to the second orthogonal converters 2210-1 through 2210-NT where subcarrier demodulation is performed. Data demodulation is then performed for each subcarrier by the demodulators 2211-1-1 through 2211-NT-Nc with the signals which have undergone subcarrier demodulation being used as input signals, and the results thereof are output. After these output signals have been converted into signal sequence for each antenna stream by the first parallel-to-serial converters 2212-1 through 2212-NT, they are further converted by the second parallel-to-serial converters 2213-1 through 2213-U into U number of signal sequence for each transmitting station.

Lastly, the deinterleaver circuits 2214-1 through 2214-U deinterleave the signal sequence which have been converted into U number series and supply the results of this to the decoders 2215-1 through 2215-U. The decoders 2215-1 through 2215-U decode the deinterleaved results and output the decoding results.

By employing this type of structure, even when a broadband signal is being transmitted, by performing directional control on each of the orthogonal signal components, it is possible to identify the signals for each transmitting station using the timing offset between optional transmitting stations. Note that the above described processing can also be applied when guard intervals (GI) are present. Moreover, by adding a certain quantity of GI, it is possible to prevent any distortion in the spectrum of the transmitted signals when waveform shaping has been performed on the transmitting side. In addition, in the above described communication system, uplink transmission is assumed, however, this communication system can also be applied in a downlink in which the transmitting side is an access point and the receiving side is a terminal. Moreover, in the above described communication system, a system for multi-users has been assumed, however, this system can also be applied in the case of a single user MIMO (U=1). The effects for a single user differ from those of the related art in that no GI is required, thereby enabling the transmission efficiency to be improved.

In the above described communication system, by causing the operations subsequent to the first orthogonal converters 2205-1 through 2205-NR to be carried out in the manner described below, an improvement in performance can be anticipated.

Figure 14:
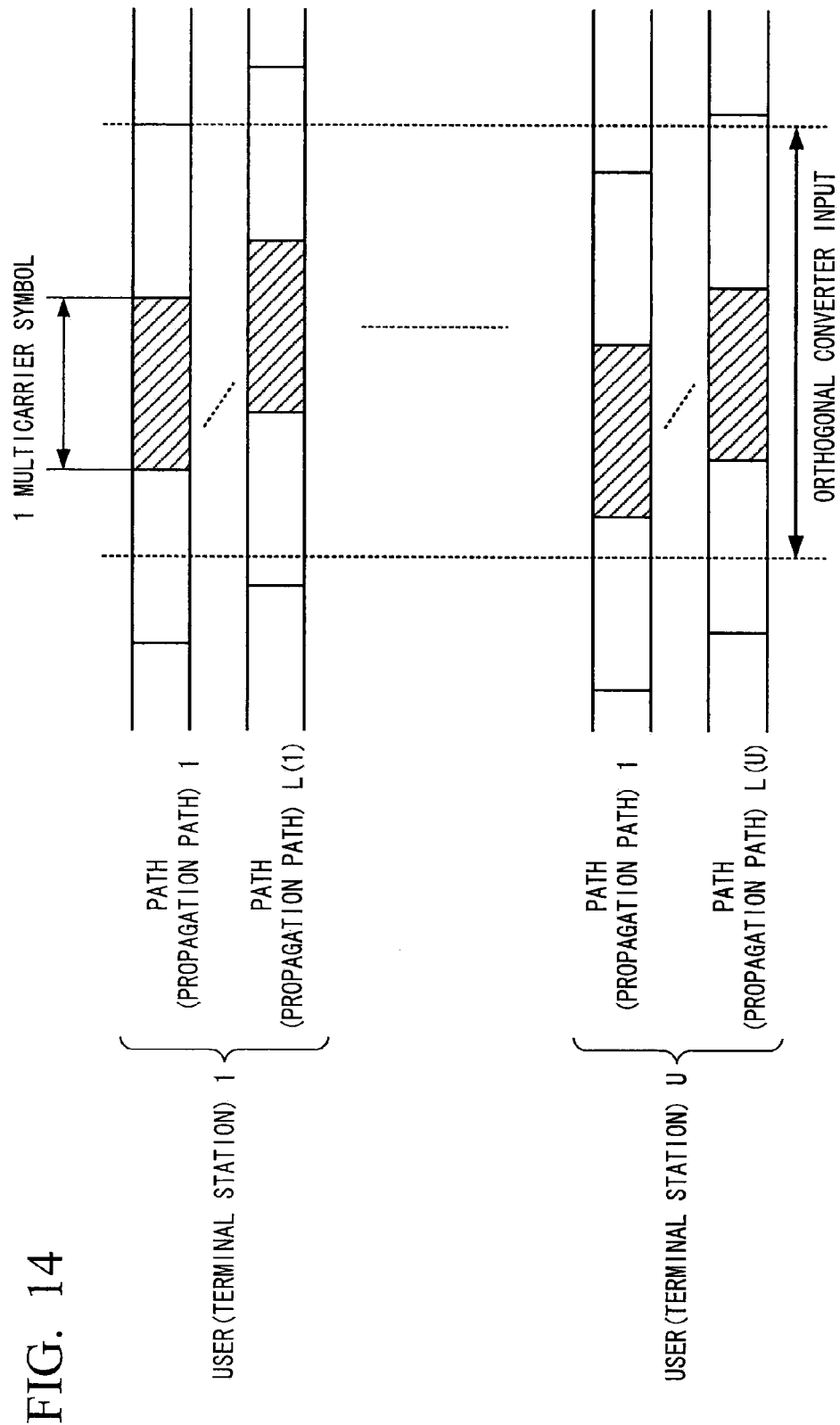
FIG. 14 is a conceptual view showing an example of an input signal which is input into a first orthogonal converter according to the second embodiment.

As is shown in FIG. 14, the number N of input signals which are input into the first orthogonal converters 2205-1 through 2205-NR is set such that margins of Mh received signals and Mt received signals are formed in the front and rear respectively in order to group transmitted signals from each transmitting station and multicarrier transmitted blocks which each consist of more than one block, and suppress the effects of IBI. Thereafter, multi-user detection and inverse orthogonal conversion which have the same content as is described above are performed. Thereafter, with Nw number of signals which are extracted by the rectangular filter circuits 2208-1 through 2208-NT taken as Nc, only the blocks shown by the diagonally shaded portions in FIG. 14 which have been detected for each transmitting station are extracted, and are input unmodified into the second orthogonal converters 2210-1 through 2210-NT.

In this manner, by setting the inputs into the first orthogonal converters 2205-1 through 2205-NR, while suppressing IBI it is possible to perform demodulation without causing the multicarrier transmitted signal blocks to become distorted. Moreover, the second memory 2209-1 through 2209-NT are rendered unnecessary.

In addition, although it is also possible to suppress IBI using the method described above by setting N such that transmitted signals of one or more blocks are grouped together for a particular transmitting station, in this case, it is necessary for the multi-user detectors 2206-1 through 2206-N to be installed for all of the U number of transmitting stations. Moreover, it is also necessary to derive multi-user detection weights in each transmitting station.

The above described operations can also be applied when a conventional guard interval (GI) is present. By adding GI to a certain extent, then when waveform shaping has been performed on the transmitting side, it is possible to prevent the spectrum of the transmitted signals becoming distorted.

Moreover, by making N=Nc in the above described communication system, it is also possible for the first orthogonal converters and the second orthogonal converters to be united into a single orthogonal converter which makes it possible for the scale of the circuitry to be decreased.

Figure 15:
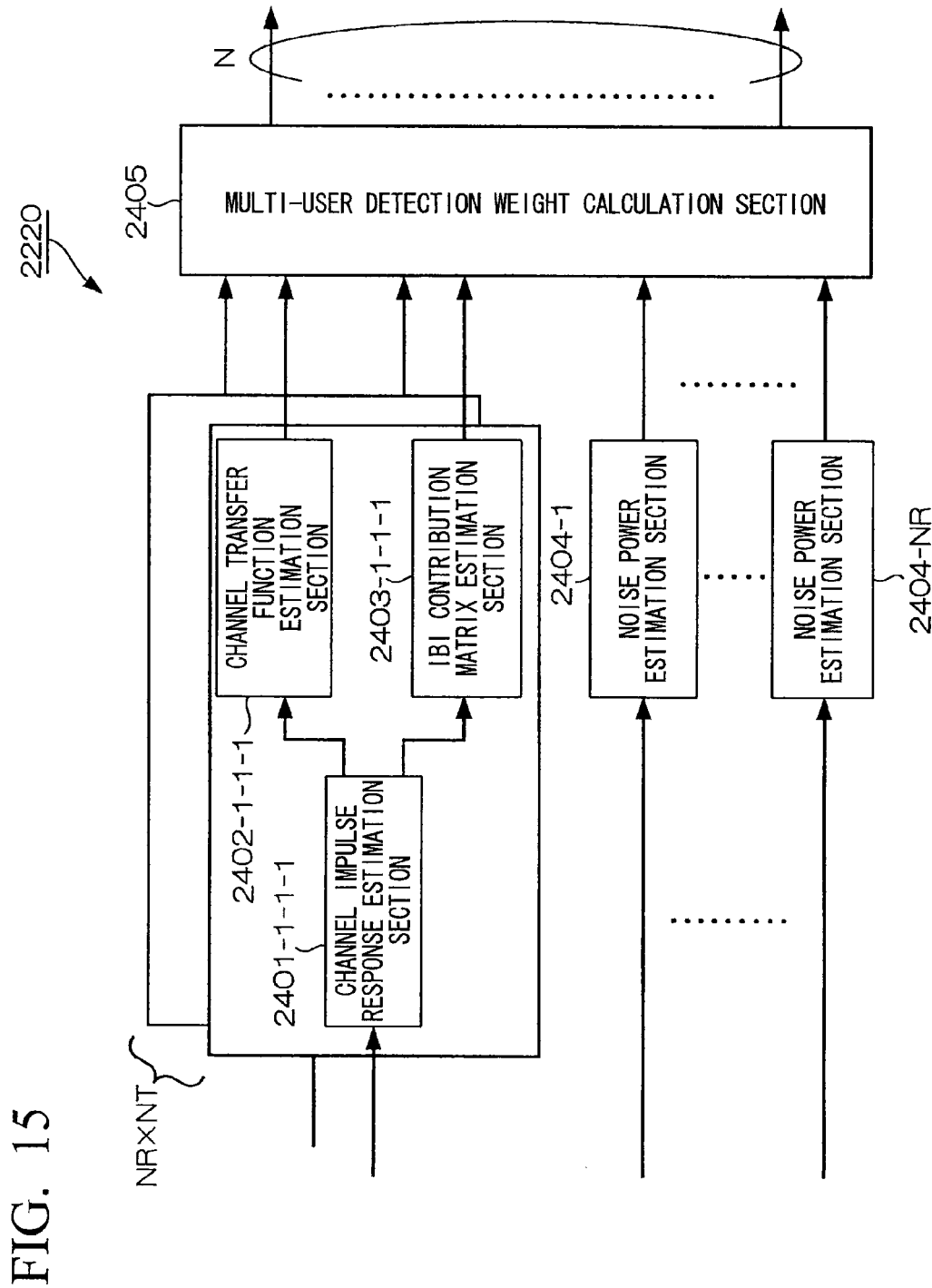
FIG. 15 is a block diagram showing a structural example of a multi-user detection weight calculator 2120 according to the second embodiment.

Next, FIG. 15 is a block diagram showing a structural example of the multi-user detection weight calculator 2220. In FIG. 15, 2401-1-1-1 through 2401-NR-U-nt (U) are channel impulse response estimation sections, 2402-1-1-1 through 2402-NR-U-nt (U) are channel transfer function estimation sections, 2403-1-1-1 through 2403-NR-U-nt (U) are IBI contribution matrix estimation sections, 2404-1 through 2404-NR are noise power estimation sections, and 2405 is a multi-user detection weight calculation section.

Taking a pilot received signal as an input signal, an estimated value for the propagation path impulse response which is transmitted from the $i^{th}$ antenna of the $u^{th}$ transmitting station and is received by the $nr^{th}$ receiver antenna of the receiving station is output as an output value from the channel impulse response estimation section 2401-*nr-u-i* from among the channel impulse response estimation sections 2401-1-1-1 through 2401-NR-U-n (U) as is shown in the above described Formula (33) described in the first embodiment.

The transfer function can be estimated by calculating a sliding correlation between the received signal and the pilot signal. It is also possible to estimate the transfer function by means of maximum likelihood estimation from the received signal and the pilot signal.

Thereafter, using channel impulse response values estimated respectively by the channel impulse response estimation sections 2401-1-1-1 through 2401-NR-U-nt (U) as input values, estimation values for the channel transfer functions (or for each component after orthogonal conversion) are calculated in the channel transfer function estimation sections 2402-1-1-1 through 2402-NR-U-nt (U), and the respective components after orthogonal conversion of the estimation values for the channels in the 1131 components are calculated in the 1131 contribution matrix estimation sections 2403-1-1-1 through 2403-NR-U-nt (U), and these are then output. The $k^{th}$ component hat (^) $H_{nr,u,i}(m, k)$ of the estimation values of the channel transfer function and the $k^{th}$ component hat (^) $C_{nr,u,i}(m, k)$ of the estimation values for the channels in the IBI components after orthogonal conversion are expressed respectively by Formula (34) and Formula (35) described in the first embodiment.

Here, hat (^) $X_{nr,u,i}(m)$ is expressed by Formula (36) described in the first embodiment, and hat (^) $Y_{nr,u,i}(m)$ is expressed by Formula (37) described in the first embodiment.

In contrast, taking the pilot received signal as an input signal, the noise power at each receiver antenna is estimated in the noise power estimation sections 2404-1 through 2404-NR, and the resulting estimated value is then output. The noise power can be estimated, for example, from the difference between the received signal power and the sum of the estimated power of the transfer functions. In this case, the powers of delay components whose transfer functions could not be estimated are added to the noise power. In addition to this, it is also possible to detect time segments where signals have not been received by the respective receiver antennas, and to measure the noise power from the received power measured in these segments.

The multi-user detection weight calculation section 2405 uses the above described estimated values for the channel transfer functions (or for each component after orthogonal conversion) output from the channel transfer function estimation sections 2402-1-1-1 through 2402-NR-U-nt (U), and also the estimated values hat (^) C (m, k) of the respective orthogonal components of the IBI output from the IBI contribution matrix estimation sections 2403-1-1-1 through 2403-NR-U-nt (U), and the estimated values 2 hat (^)$\sigma^2_{nr}$ (nr=1~NR) of the noise power output from the noise power estimation sections 2404-1 through 2404-NR as input values, calculates multi-user detection weights, and outputs the result of these calculations.

Here, in the above described multi-user detection weight calculation section 2405, a method is used in which pilot signals are transmitted by the transmitting side and estimations are made based on these, however, it is also possible to use received signals from the data section as input signals, and to consider signals obtained through decision feedback as the transmitted pilot signals, and thereby estimate the multi-user detection weight. Moreover, the above described channel signal response estimation is performed using time series as input signals, however, it is also possible for this estimation to be performed using post-orthogonal conversion received signals as input signals.

The above described system estimates noise power using the noise power estimation sections 2404-1 through 2404-NR, however, if weight 2 is used, this section is not required.

Successive Interference Cancel Device

In the receiving station, instead of performing multi-user detection, it is also possible to separate signals using a successive interference cancel device.

Figure 16:
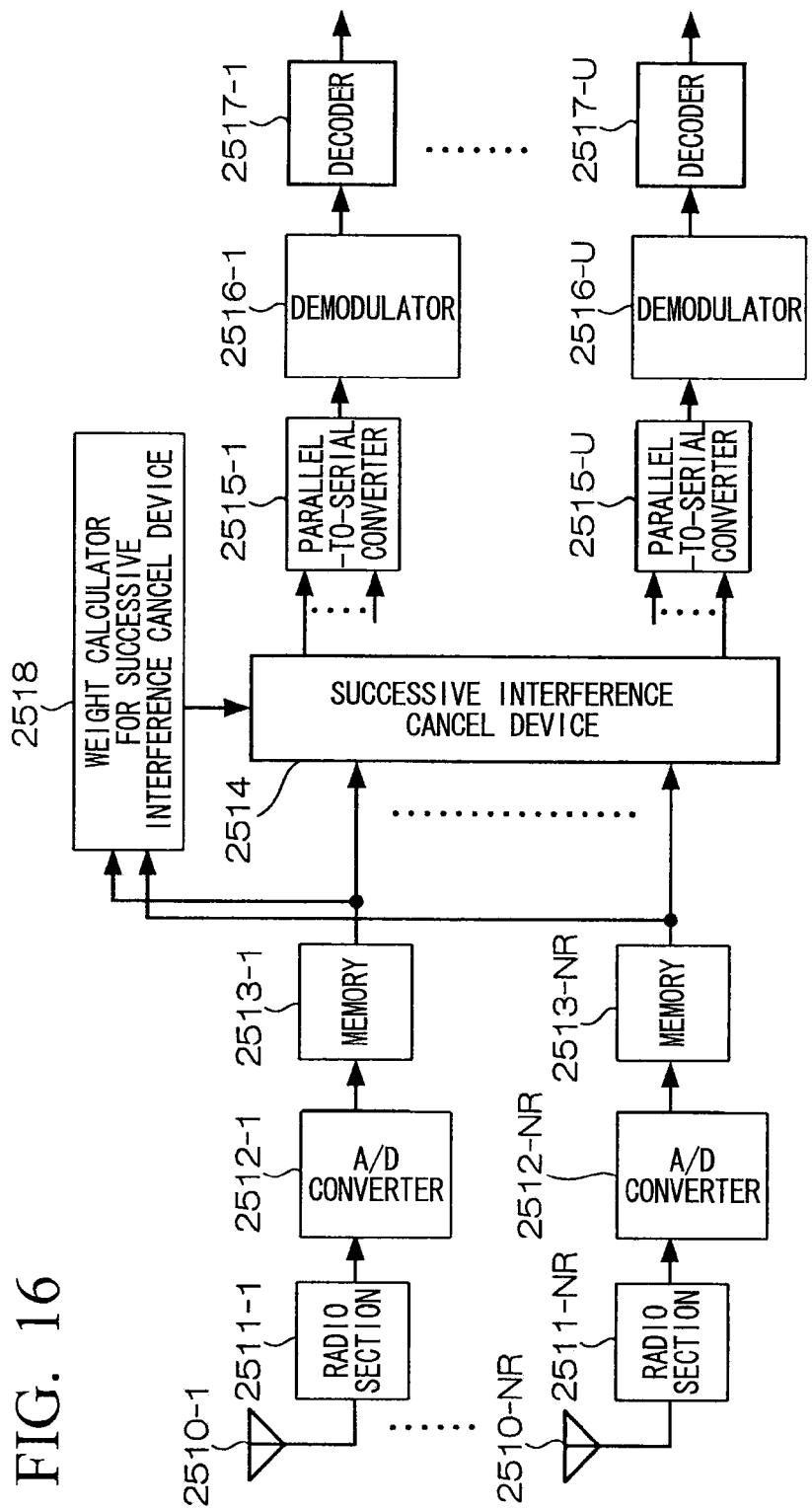
FIG. 16 is a block diagram showing the structure of a receiver when a successive interference cancel device is used in the second embodiment.

FIG. 16 is a block diagram showing the structure of a receiver when a successive interference cancel device is used. In FIG. 16, 2510-1 through 2510-NR are receiver antennas, 2511-1 through 2511-NR are radio sections, 2512-1 through 2512-NR are A/D converters, 2513-1 through 2513-NR are memories, 2514 is a successive interference cancel device, 2515-1 through 2515-U are parallel-to-serial converters, 2516-1 through 2516-U are demodulators, and 2517-1 through 2517-U are decoders. 2518 is a weight calculator for the successive interference cancel device.

Signals received by the receiver antennas 2510-1 through 2510-NR are supplied to the radio sections 2511-1 through 2511-NR for each receiver antenna. The radio sections 2511-1 through 2511-NR then perform frequency conversion respectively for each receiver antenna, and output baseband signals. Using these baseband signals as input signals, the A/D converters 2512-1 through 2512-NR convert the analog signals into digital signals. Signal sequence which have been converted into these digital signals are then stored in the memory 2513-1 through 2513-NR.

Thereafter, N number of signals are read and are input into the successive interference cancel device 2514 together with equalization weights which are output values from the weight calculator 2518 for the successive interference cancel device, while the signal sequence stored in the memory 2513-1 through 2513-NR are being shifted each time by Nw number of signals. The successive interference cancel device 2514 is described below in detail. The NT number of signal sequence which are output from the successive interference cancel device 2514 are supplied to the parallel-to-serial converters 2515-1 through 2515-U. Signal sequence are then output for each (i.e., for U number of) transmitting station from the parallel-to-serial converters 2515-1 through 2515-U. Finally, using the signal sequence which have been converted into U number of series as input signals, the demodulators 2516-1 through 2516-U output demodulated signal sequence: These signal sequence are then decoded by the decoders 2517-1 through 2517-U and the decoding results are output.

Figure 17:
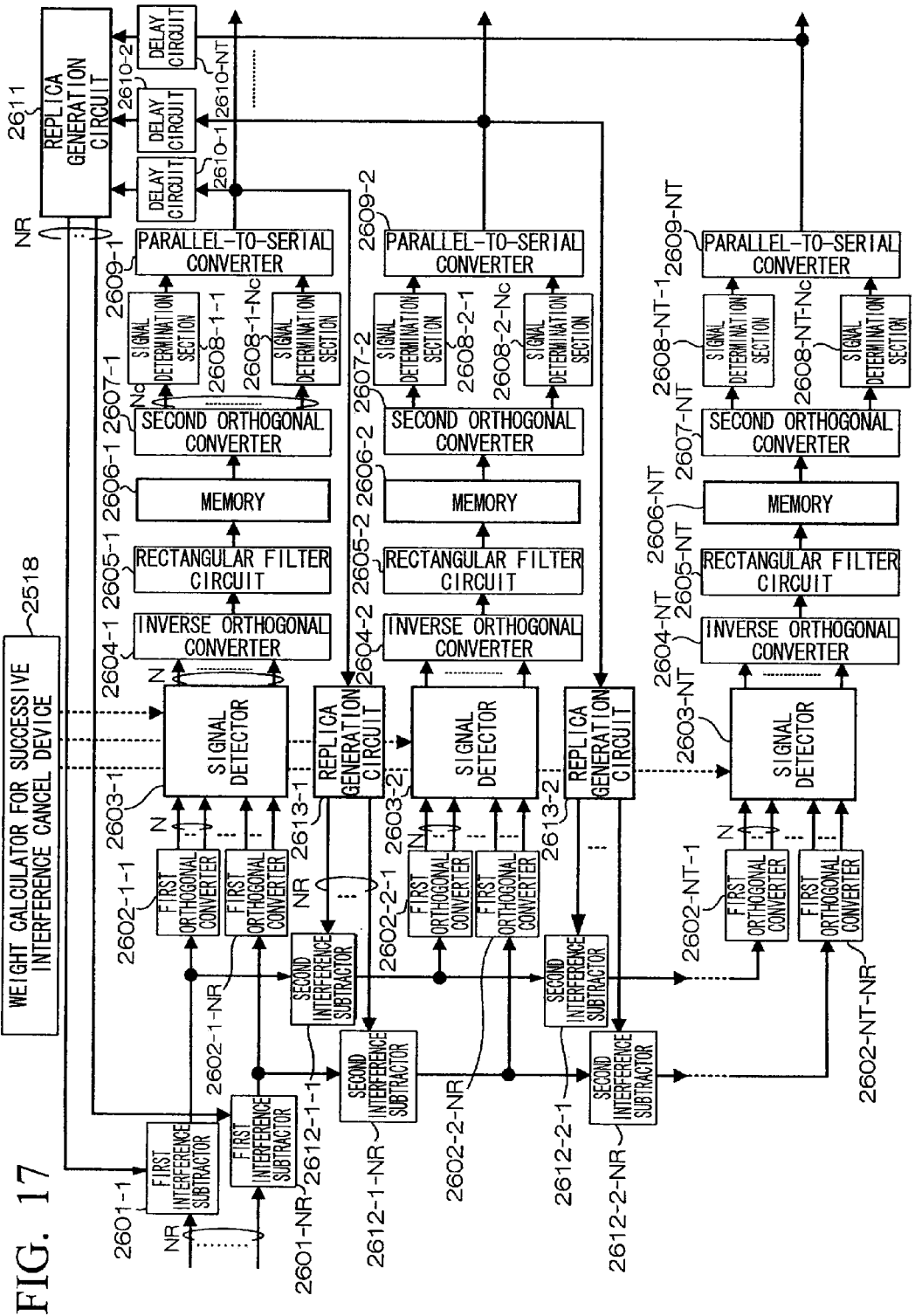
FIG. 17 is a block diagram showing the structure of a successive interference cancel device 2514 according to the second embodiment.
Figure 18:
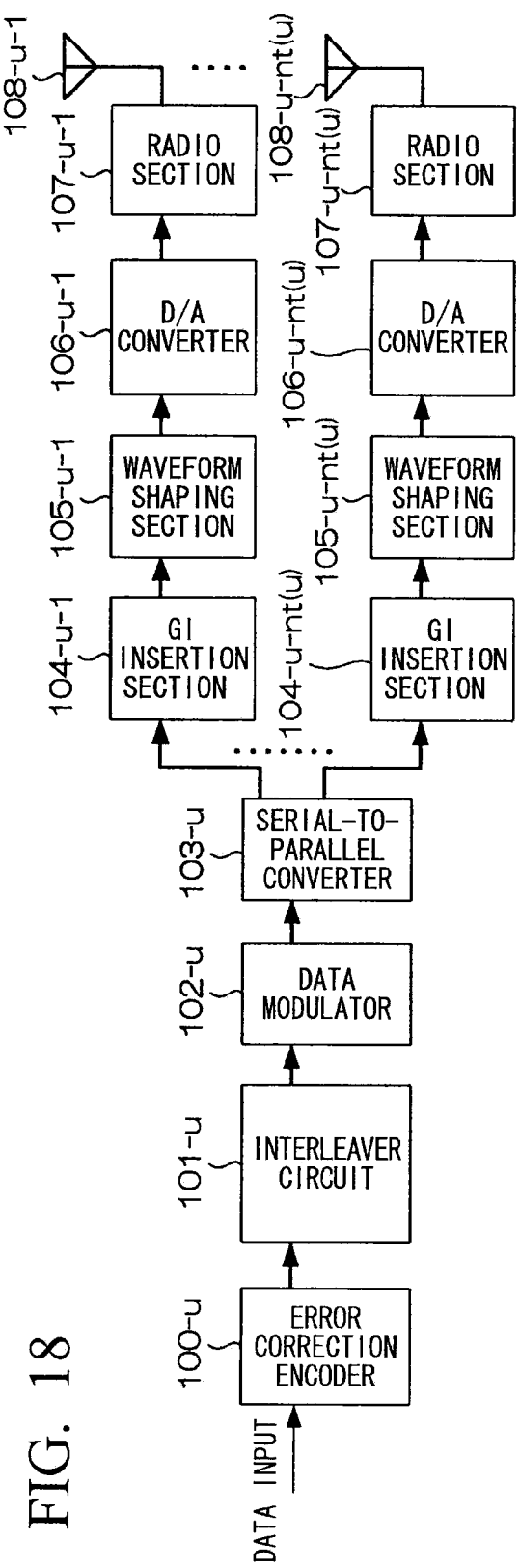
FIG. 18 is a block diagram showing a structural example of a $u^{th}$ single-carrier transmitter in a multi-user MIMO transmission which employs GI of the related art.
Figure 19:
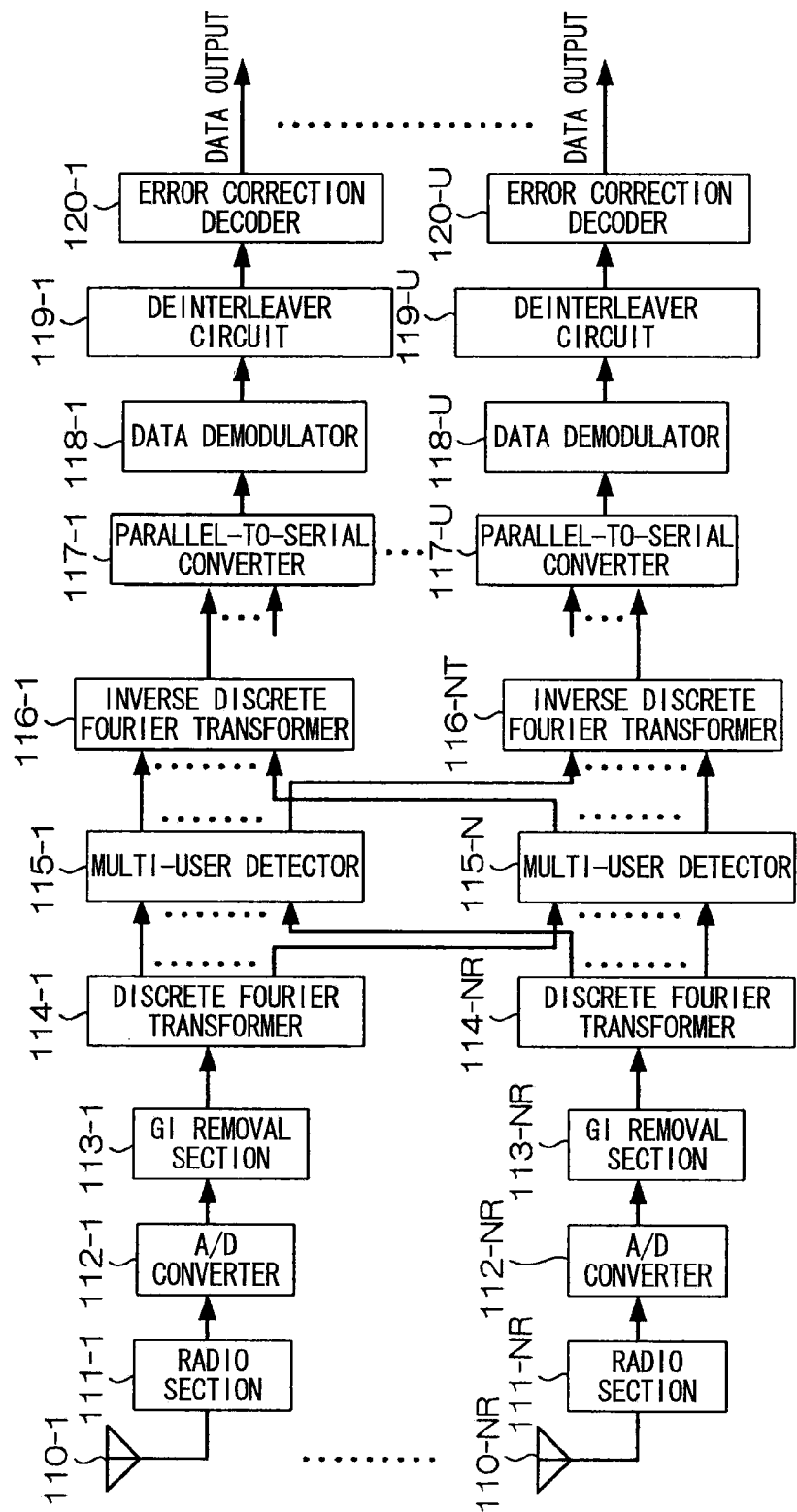
FIG. 19 is a block diagram showing a structural example of single-carrier receiver in a multi-user MIMO transmission which employs GI of the related art.
Figure 20:
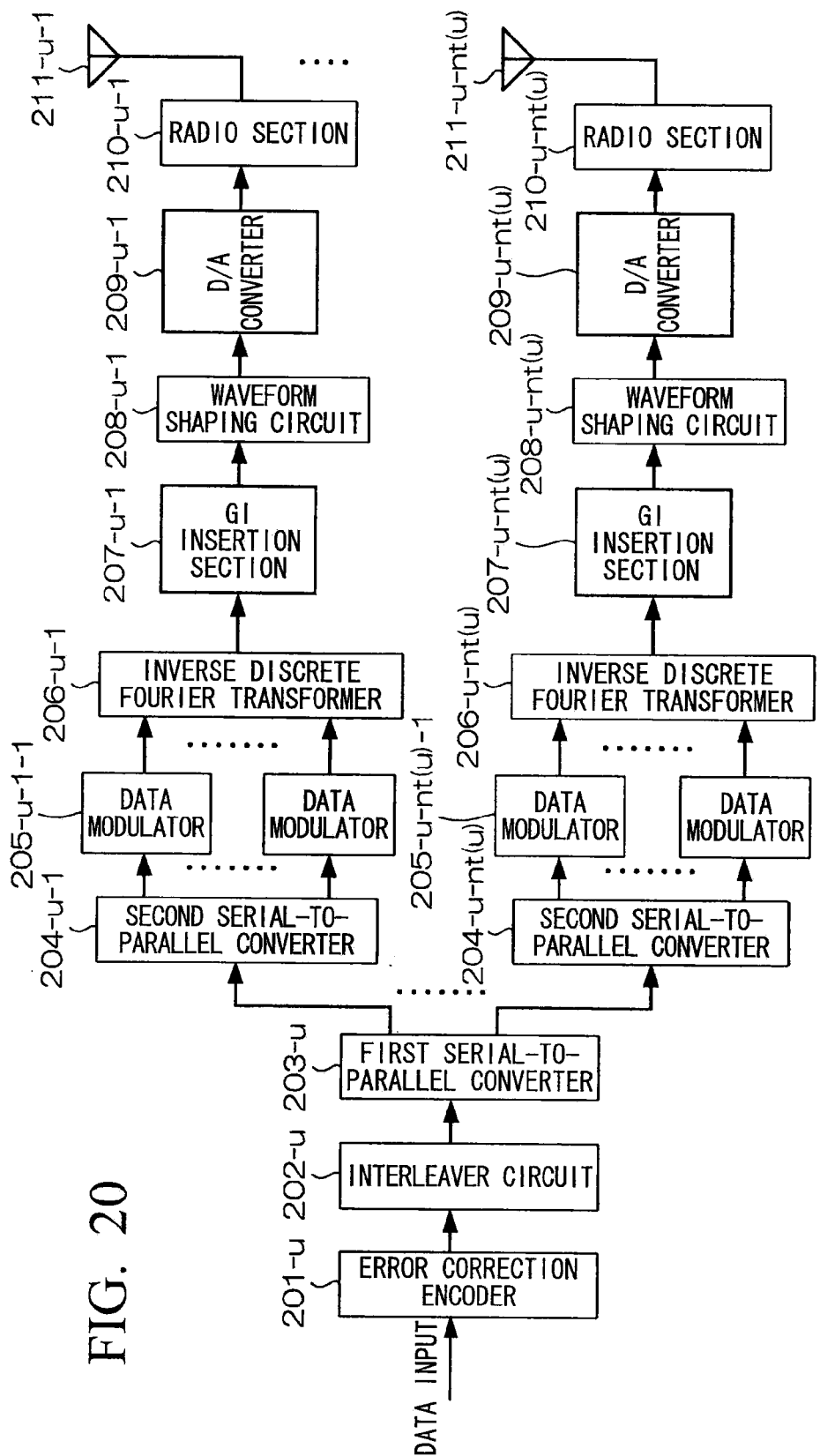
FIG. 20 is a block diagram showing a structural example of a $u^{th}$ multicarrier transmitter in a multi-user MIMO transmission which employs GI of the related art.
Figure 21:
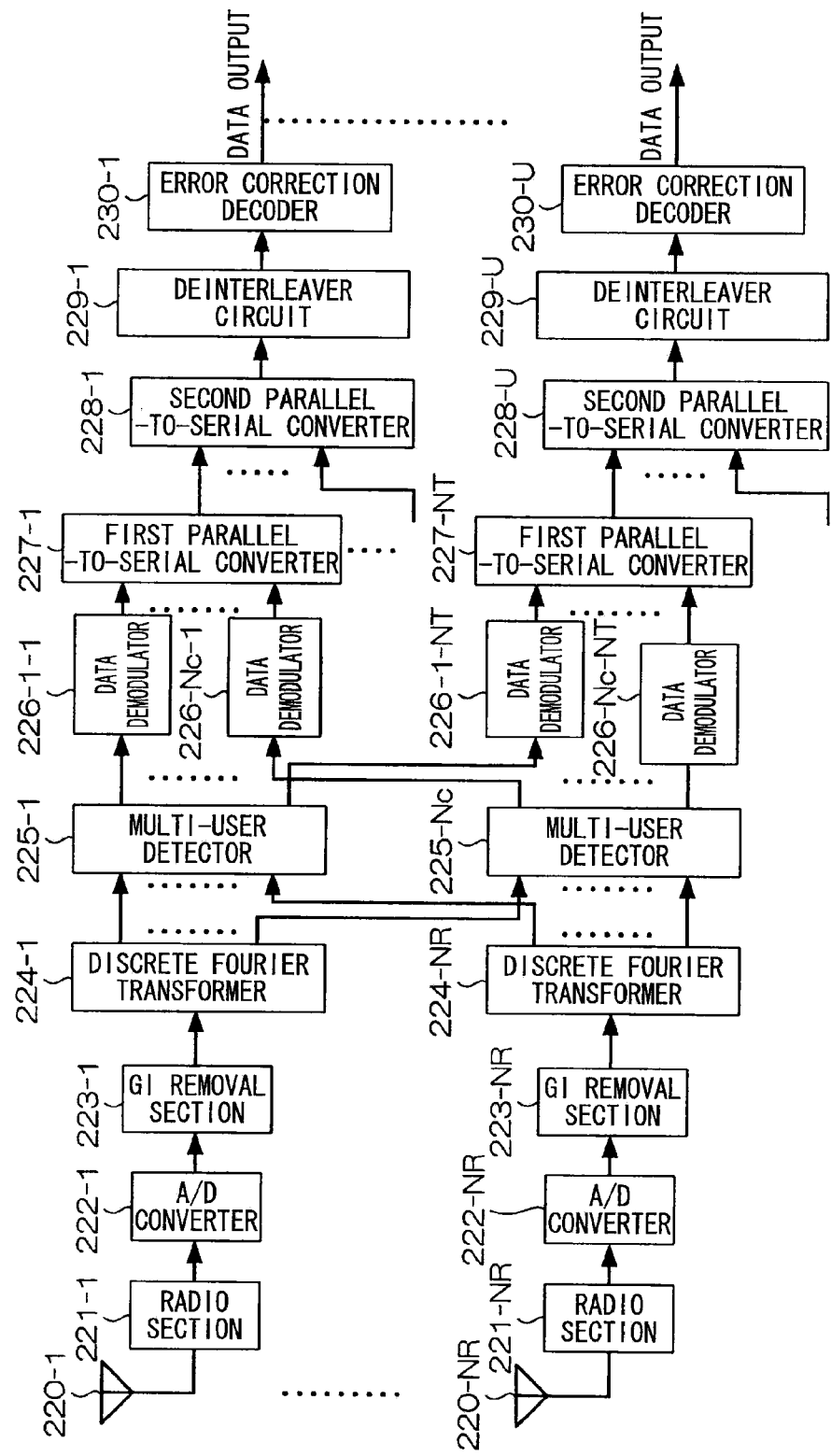
FIG. 21 is a block diagram showing a structural example of multicarrier receiver in a multi-user MIMO transmission which employs GI of the related art.
Figure 22:
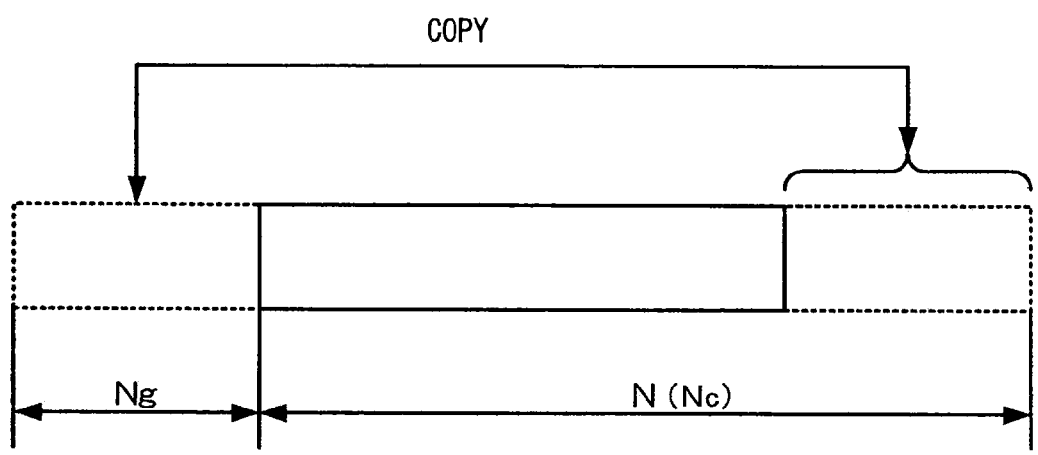
FIG. 22 is a conceptual view showing the structure of a transmission block in a multi-user MIMO transmission.

Next, FIG. 17 is a block diagram showing the structure of the successive interference cancel device 2514. In FIG. 17, 2601-1 through 2601-NR are first interference subtractors, 2602-1-1 through 2602-NT-NR are first orthogonal converters, 2603-1 through 2603-NR are signal detectors, 2604-1 through 2604-NT are inverse orthogonal converters, 2605-1 through 2605-NT are rectangular filter circuits, 2606-1 through 2606-NT are memories, 2607-1 through 2607-NT are second orthogonal converters, 2608-1-1 through 2608-NT-Nc are signal determination sections, 2609-1 through 2609-NT are parallel-to-serial converters, 2610-1 through 2610-NT are delay circuits, 2611 is a replica generation circuit, 2612-1-1 through 2612-(NT−1)-NR are second interference subtractors, and 2613-1 to 2613-(NT−1) are replica generation circuits.

When the successive interference cancel device 2514 is operated, sequence allocation is essential. Here, the estimation values for each antenna channel are used for the sequence allocation, and all normal allocating methods which are used in successive interference cancel devices may be applied, such as instantaneous reception power (i.e., the signal-to-noise power ratio-SNR), or such is the mean transmission quality (for example, the signal-to-interference plus noise power ratio SINR, or the bit error rate performance or the like) for each transmitted signal sequence, or such as a transmitted signal sequence arranged in order of highest priority.

In the description given below, in the received signal of the $m^{th}$ block, demodulation is performed in sequence from the first stream of the first transmitting station, and when the demodulation of the $i^{th}$ stream of the $u^{th}$ transmitting station is being performed, the $i-1^{th}$ demodulation results for the $u^{th}$ transmitting station (when $i=1$, then the nt $(u-1)^{th}$ demodulation results for the $u-1^{th}$ transmitting station) are used.

In the replica generation circuit 2611, a received signal sequence (i.e., time series) formed by the post determination NT series before the $m-1^{th}$ block is used as an input signal, and using the estimated channel impulse response, a replica of the interference component from the block immediately prior thereto is created (i.e., time series formed by NR), and the result of this (i.e., a time series signal) is output.

In the first interference subtractors 2601-1 through 2601-NR, taking a received signal made up of the NR series (time series) and the replica of the interference component from the block immediately prior thereto which was created by the replica generation circuit 2611 as inputs, the interference component is subtracted from the received signal and the result is output.

Taking received signals from which the interference components have been removed and which are formed in blocks, each block being formed respectively by N number of time series signals, as inputs, the first orthogonal converters 2602-1-1 through 2602-NT-NR perform orthogonal conversion, and output N number of orthogonal components.

Taking the received signals from which the N number of interference components have been removed after the orthogonal conversion by the first orthogonal converters 2602-1-1 through 2602-NT-NR, and also weights which take into consideration the residual inter-block interference calculated by the weight calculator for the successive interference cancel device 2518 as input values, the signal detectors 2603-1 through 2603-NT perform signal detection, and output the N number of results.

The inverse orthogonal converters 2604-1 through 2604-NT then perform inverse orthogonal conversion on the N number of signals after signal detection, and output N number of time series signals. In the rectangular filter circuits 2605-1 through 2605-NT, Mh number of signals in the front half portion and Mt number of signals in the rear half portion which are greatly affected by inter-block interference are removed from the N number of series signals after the inverse orthogonal conversion, and only Nw(=N−Mh−Mt) number of signals which are the signals remaining in the center which are minimally affected by interference are extracted and output. The respective Nw number of time series signals are stored in the memory 2606-1 through 2606-NT, and when signals for the Nc number of multicarrier transmitted blocks are obtained, these are output. Orthogonal conversion of Nc points is then performed on the Nc number of multicarrier blocks which are the output values from the memory 2606-1 through 2606-NT in the second orthogonal converters 2607-1 through 2607-NT, and the Nc number of orthogonal components which are thereby obtained are output. In the signal determination sections 2608-1-1 through 2608-NT-Nc, soft decision or hard decision processing is performed, and Nw number of determination results are output. In the delay circuits 2610-1 through 2610-NT, a delay of one block portion is applied to the Nc number of signals which have undergone soft decision or hard decision processing, and these are then output to the replica generation circuit 2611.

Next, taking the received signals (i.e., time series) formed by NR series from which the interference has been removed, and the replica of the interference component from the block immediately prior which was created by the replica generation circuits 2613-1 through 2613-(NT−1) as input signals, the second interference subtractors 2612-1-1 through 2612-(NT−1)-NR subtract newly created interference components from the received signals from which the interference has been removed, and output the results.

Note that the weight which is required in the equalization section of the weight calculator 2518 for the successive interference cancel device is a weight which reduces to a minimum any discrepancy between the received signal and the transmitted signal after the interference has been removed, and this weight can be derived in the same way as in the formula development given above.

The first orthogonal converters 2602-1-1 through 2602-NT-NR may also be provided at a stage in front of the first interference subtractors 2601-1 through 2601-NR. In this case, although NR×NT number of first orthogonal converters was previously required, the number thereof can be decreased to NR. In addition, in this case, interference replicas output from the replica generation circuit 2611 and the replica generation circuits 2613-1 through 2613-(NT−1) must be converted into orthogonal components. Accordingly, the second interference subtractors 2612-1-1 through 2612-(NT−1)-NR remove the interference from each orthogonal component.

Signals for either soft decision values or hard decision values are output from the signal determination processing sections 2608-1 through 2608-NT. Moreover, it is also possible to input them first into an error correction decoder and then perform soft decision processing or hard decision processing on the output results thereof.

The above described operations are an illustration of the successive interference cancel device 2514, however, in the same way as in the related art, this operation can also be performed by a parallel-to-serial interference removal device.

Variant Examples of the First and Second Embodiments

Varying the Size of the Rectangular Window

Because the propagation path (i.e., the channel impulse response) varies for each terminal station, the number of signals at the ends of the blocks which are greatly affected by IBI in each terminal station also varies. Therefore, on the receiver side, based on results from the channel estimation, the Mh number of signals in the front half portion and Mt number of signals in the rear half portion which are removed, and the Nw number of signals which are cut out (i.e., the size of the rectangular window filter) are changed adaptively to correspond to users who have the most signals affected by IBI. As a result, it is possible to improve the transmission quality.

Specifically, a delay spread or a maximum delay time in a channel is determined from the estimated channel impulse response, and based on the value thereof, an optimum Nw is estimated in advance using a mathematical function or a table on the receiving side.

Varying the Size of the FFT

The number of signals which are greatly affected by IBI at the ends of a block is constant irrespective of the size N of the orthogonal converters 1113-1 through 1113-NR in the first embodiment and the size of the first orthogonal converters 2205-1 through 2205-NR in the second embodiment. Therefore, when the orthogonal converters 1113-1 through 1113-NR and the first orthogonal converters 2205-1 through 2205-NR are Fast Fourier Transform (FFT), then if the number of input/output signals is $N=2^n$, and the number of cutout signals is Nw, the value of n which requires the smallest FFT calculation amount per signal is provided by the following Formula (48).

[Formula 48]

$$Nw = \frac{2^n n \ln 2}{1 + n \ln 2} \qquad (48)$$

Wherein the FFT calculation amount is $N \log_2 N = n2^n$.

From the calculation result in Formula (48), when the number Nw of cutout signals has been decided, by deciding the optimum FFT block size n in accordance with the above formula, on the receiving station side, it is possible to reduce to a minimum the amount of calculation needed to demodulate all the signals.

Effects

According to the above described embodiments, when a comparison is made with a multi-user MIMO of the related art which utilizes GI, it is possible to reduce any deterioration in the transmission quality which is caused by timing offset even when the reception timings at which signals are received from a plurality of transmitting stations each exceed the GI length. Accordingly, because timing control is either not necessary for the transmitting stations, or else only rudimentary control suffices, it is possible to simplify the system on the transmitting side.

Moreover, because it is no longer necessary to use GI which has hitherto been required in the related art, it is possible to improve the transmission efficiency.

Furthermore, because it is possible for a plurality of transmitting stations to communicate simultaneously, the frequency utilization efficiency can be improved.

Moreover, compared with the related art, because the only change has been the addition of a computer which multiplies a rectangular window by a multi-user detection weight and a post-inverse orthogonal conversion received signal, no major changes to the hardware are necessary.

Moreover, because the system structure takes multi-user MIME into consideration, it is possible to separate signals between users and antennas even when a transmitted signal has no GI.

The invention claimed is:

1. A reception device which receives a plurality of radio signals transmitted from a transmission device which is provided with either one or a plurality of antenna elements by means of a plurality of antenna elements, comprising:
 a first orthogonal conversion unit which performs orthogonal conversion on N number wherein N>1, of time series data extracted from the radio signals received by the respective antenna elements;
 a detection unit which extracts transmitted signals from the respective antenna elements of the transmission devices from N number wherein N>1, of signals which have been orthogonally converted by the first orthogonal conversion unit;
 an inverse orthogonal conversion unit which performs inverse orthogonal conversion on the transmitted signals extracted by the detection unit; and
 a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number, wherein $Nw=N-Mh-Mt \geq 1$, of time series data, wherein after the first orthogonal conversion unit has extracted N number of time series data starting from an $A^{th}$ radio signal received by the respective antenna elements, the first orthogonal conversion unit extracts N number of time series data starting from the $(A+Nw)^{th}$ radio signal, and
 connects a plurality of the Nw number of time series data output from the rectangular filter unit in time series sequence so as to use them as the transmitted signals.

2. The reception device according to claim 1, further comprising:
 a second orthogonal conversion unit which performs orthogonal conversion on Nc number wherein Nc>1, of multicarrier symbols from the time series data extracted by the rectangular filter unit; and
 a demodulation unit which performs decoding on each orthogonal component of the Nc number of orthogonal components which have been orthogonally converted by the second orthogonal conversion unit.

3. A transmission device which comprises either one or a plurality of antenna elements, and which transmits radio signals to the reception device according to claim 1 using these antenna elements, comprising
 a symbol interleaver unit which performs interleaving on symbol blocks formed by Nw/2 vertically and Nx wherein Nx is an arbitrary positive number, horizontally for signal sequence which have undergone serial-to-parallel conversion.

4. A radio reception method in which a plurality of radio signals transmitted from a transmission device which comprises either one or a plurality of antenna elements are received by the reception device according to claim 1, comprising:
 first orthogonal converting in which orthogonal conversion is performed on N number wherein N>1, of time series data extracted from the radio signals received by the respective antenna elements;
 detecting in which transmitted signals transmitted from the respective antenna elements of the transmission devices are extracted from N number wherein N>1, of signals which have been orthogonally converted in the first orthogonal converting;
 inverse orthogonal converting in which inverse orthogonal conversion is performed on the transmitted signals extracted in the detecting; and
 rectangular filtering in which Mh number of time series data are removed from the front end portion and Mt number of time series data are removed from the rear end portion of the transmitted signals which have been extracted in the inverse orthogonal converting, so as to extract Nw wherein $Nw=N-Mh-Mt \geq 1$, number of time series data.

5. The radio reception method according to claim 4, further comprising:
 second orthogonal converting in which orthogonal conversion is performed on Nc wherein Nc>1, number of multicarrier symbols from the Nw number of time series data; and
 demodulating in which decoding is performed on each orthogonal component of the Nc number of orthogonal components which have been orthogonally converted.

6. A reception device which receives a plurality of radio signals transmitted from a transmission device which is provided with either one or a plurality of antenna elements by means of a plurality of antenna elements, comprising:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit;

a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=N−Mh−Mt≧1, of time series data;

a second orthogonal conversion unit which performs orthogonal conversion on Nc number wherein Nc>1, of multicarrier symbols from the time series data extracted by the rectangular filter unit;

a demodulation unit which performs decoding on each orthogonal component of the Nc number of orthogonal components which have been orthogonally converted by the second orthogonal conversion unit; and a multi-user detection weight calculation unit which, based on impulse responses from the antenna elements of the transmission devices to each of its own antenna elements, calculates multi-user detection weights which are used as parameters when the transmitted signals from each transmission device are extracted by the detection unit, wherein after the first orthogonal conversion unit has extracted N number of time series data starting from an $A^{th}$ radio signal received by the respective antenna elements, the first orthogonal conversion unit extracts N number of time series data starting from the $(A+Nw)^{th}$ radio signal, and connects a plurality of the Nw number of time series data output from the rectangular filter unit in time series sequence so as to use them as the transmitted signals.

7. A reception device which receives a plurality of radio signals transmitted from a transmission device which is provided with either one or a plurality of antenna elements by means of a plurality of antenna elements, comprising:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit;

a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=N−Mh−Mt≧1, of time series data; and an adjustment unit which, based on radio signals from the transmission device having the greatest interference, adjusts the value of at least one or more of the N, the Mh, the Mt, or the Nw.

8. The reception device according to claim 7, further comprising:

a second orthogonal conversion unit which performs orthogonal conversion on Nc number wherein Nc>1, of multicarrier symbols from the time series data extracted by the rectangular filter unit; and a demodulation unit which performs decoding on each orthogonal component of the Nc number of orthogonal components which have been orthogonally converted by the second orthogonal conversion unit.

9. A reception device which receives a plurality of radio signals transmitted from a transmission device which is provided with either one or a plurality of antenna elements by means of a plurality of antenna elements, comprising:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit; and a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=N−Mh−Mt≧1, of time series data, wherein the Nw and the N have a mutual relationship whereby Nw=$(2^n \cdot n \cdot \ln2)/(1+n\sqrt{\ln2})$ wherein N=$2^n$, and n is an arbitrary positive number.

10. The reception device according to claim 9, further comprising:

a second orthogonal conversion unit which performs orthogonal conversion on Nc number wherein Nc>1, of multicarrier symbols from the time series data extracted by the rectangular filter unit; and a demodulation unit which performs decoding on each orthogonal component of the Nc number of orthogonal components which have been orthogonally converted by the second orthogonal conversion unit.

11. A reception device which receives a plurality of radio signals transmitted from a transmission device which is provided with either one or a plurality of antenna elements by means of a plurality of antenna elements, comprising:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit;

a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=NMh−Mt≧1, of time series data;

a second orthogonal conversion unit which performs orthogonal conversion on Nc number wherein Nc>1, of multicarrier symbols from the time series data extracted by the rectangular filter unit;

a demodulation unit which performs decoding on each orthogonal component of the Nc number of orthogonal components which have been orthogonally converted by the second orthogonal conversion unit;

a signal determination unit which performs soft decision or hard decision on the Nc number of orthogonal components which have been orthogonally converted by the second orthogonal conversion unit, and outputs Nc number of determination results; and a successive interference cancel unit which, based on time series data output from the rectangular filter unit, removes interference components from the radio signals received by the respective antenna elements using the Nc number of output signals orthogonally converted by the second orthogonal conversion unit and the determination signals determined by the signal determination unit, wherein signals which are output from the successive interference cancel unit are input into the first orthogonal conversion unit.

12. A reception device which receives a plurality of radio signals transmitted from a transmission device which is provided with either one or a plurality of antenna elements by means of a plurality of antenna elements, comprising:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit;

a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=N−Mh−Mt≧1, of time series data;

a successive interference cancel unit which, based on time series data output from the rectangular filter unit, removes interference components from the radio signals received by the respective antenna elements, and signals which are output from the successive interference cancel unit are demodulated.

13. The reception device according to claim 12, further comprising:

a second orthogonal conversion unit which performs orthogonal conversion on Nc number wherein Nc>1, of multicarrier symbols from the time series data extracted by the rectangular filter unit; and a demodulation unit which performs decoding on each orthogonal component of the Nc number of orthogonal components which have been orthogonally converted by the second orthogonal conversion unit.

14. A reception device which receives a plurality of radio signals transmitted from a transmission device which is provided with either one or a plurality of antenna elements by means of a plurality of antenna elements, comprising:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit;

a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=N−Mh−Mt≧1, of time series data; and a symbol deinterleaver unit which performs deinterleaving on symbol blocks formed by Nw/2 vertically and Nx wherein Nx is an arbitrary positive number, horizontally for the output from the rectangular filter unit.

15. The reception device according to claim 14, further comprising:

a second orthogonal conversion unit which performs orthogonal conversion on Nc number wherein Nc>1, of multicarrier symbols from the time series data extracted by the rectangular filter unit; and a demodulation unit which performs decoding on each orthogonal component of the Nc number of orthogonal components which have been orthogonally converted by the second orthogonal conversion unit.

16. A radio transmission/reception system which comprises either one or a plurality of transmission devices which comprise either one or a plurality of antenna elements, and which transmit radio signals using these antenna elements, and reception device which comprises a plurality of antenna elements, and which receives a plurality of radio signals transmitted from the transmission devices, wherein the reception device comprises:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit; and a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=N−Mh−Mt≧1, of time series data, wherein after the first orthogonal conversion unit has extracted N number of time series data starting from an $A^{th}$ radio signal received by the respective antenna elements, the first orthogonal conversion unit extracts N number of time series data starting from the $(A+Nw)^{th}$ radio signal, and connects a plurality of the Nw number of time series data output from the rectangular filter unit in time series sequence so as to use them as the transmitted signals.

17. The radio transmission/reception system according to claim 16, wherein the reception device further comprises:

a second orthogonal conversion unit which performs orthogonal conversion on Nc number of multicarrier symbols from the time series data extracted by the rectangular filter unit; and a demodulation unit which performs decoding on each orthogonal component of the Nc number wherein Nc>1, of orthogonal components which have been orthogonally converted by the second orthogonal conversion unit.

18. A radio transmission/reception system which comprises either one or a plurality of transmission devices which comprise either one or a plurality of antenna elements, and which transmit radio signals using these antenna elements, and reception device which comprises a plurality of antenna elements, and which receives a plurality of radio signals transmitted from the transmission devices, wherein the reception device comprises:

a first orthogonal conversion unit which performs orthogonal conversion on N number wherein N>1, of time series data extracted from the radio signals received by the respective antenna elements;

a detection unit which extracts transmitted signals from the respective antenna elements of the transmission devices from N number wherein N>1, of signals which have been orthogonally converted by the first orthogonal conversion unit;

an inverse orthogonal conversion unit which performs inverse orthogonal conversion on the transmitted signals extracted by the detection unit; and a rectangular filter unit which removes Mh number of time series data in the front end portion and Mt number of time series data in the rear end portion from the transmitted signals which have undergone inverse orthogonal conversion by the inverse orthogonal conversion unit, so as to extract Nw number wherein Nw=N−Mh−Mt≧1, of time series data, wherein the transmission devices comprise a symbol interleaver unit which performs interleaving on symbol blocks formed by Nw/2 vertically and Nx wherein Nx is an arbitrary positive number, horizontally for signal sequence which have undergone serial-to-parallel conversion, and the reception device further comprises a symbol deinterleaver unit which performs deinterleaving on symbol blocks formed by Nw/2 vertically and Nx wherein Nx is an arbitrary positive number, horizontally for the output from the rectangular filter unit.

* * * * *